(12) United States Patent
Moritz et al.

(10) Patent No.: US 11,557,283 B2
(45) Date of Patent: Jan. 17, 2023

(54) ARTIFICIAL INTELLIGENCE SYSTEM FOR CAPTURING CONTEXT BY DILATED SELF-ATTENTION

(71) Applicant: Mitsubishi Electric Research Laboratories, Inc., Cambridge, MA (US)

(72) Inventors: Niko Moritz, Allston, MA (US); Takaaki Hori, Lexington, MA (US); Jonathan Le Roux, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 78 days.

(21) Appl. No.: 17/213,942

(22) Filed: Mar. 26, 2021

(65) Prior Publication Data
US 2022/0310070 A1    Sep. 29, 2022

(51) Int. Cl.
*G10L 15/16* (2006.01)
*G10L 15/28* (2013.01)

(52) U.S. Cl.
CPC .............. *G10L 15/16* (2013.01); *G10L 15/28* (2013.01)

(58) Field of Classification Search
CPC ................................ G10L 15/16; G10L 15/18
See application file for complete search history.

(56) References Cited

U.S. PATENT DOCUMENTS

2021/0005182 A1 *   1/2021   Han ..................... G10L 25/24

FOREIGN PATENT DOCUMENTS

WO    WO-2022122121 A1 *   6/2022

OTHER PUBLICATIONS

Povey et al., "A Time-Restricted Self-Attention Layer for ASR," 2018 IEEE International Conference on Acoustics, Speech and Signal Processing (ICASSP), 2018, pp. 5874-5878, doi: 10.1109/ICASSP.2018.8462497 (Year: 2018).*

(Continued)

*Primary Examiner* — Michelle M Koeth
(74) *Attorney, Agent, or Firm* — Gennadiy Vinokur; Hironori Tsukamoto

(57) ABSTRACT

An artificial intelligence (AI) system is disclosed. The AI system includes a processor that processes a sequence of input frames with a neural network including a dilated self-attention module trained to compute a sequence of outputs by transforming each input frame into a corresponding query frame, a corresponding key frame, and a corresponding value frame leading to a sequence of key frames, a sequence of value frames, and a sequence of query frames of same ordering and by performing attention calculations for each query frame with respect to a combination of a portion of the sequences of key and value frames restricted based on a location of the query frame and a dilation sequence of the key frames and a dilation sequence of value frames extracted by processing different frames of the sequences of key and value frames with a predetermined extraction function. Further, the processor renders the sequence of outputs.

21 Claims, 16 Drawing Sheets

(56) References Cited

OTHER PUBLICATIONS

Han et al., "State-of-the-Art Speech Recognition Using Multi-Stream Self-Attention with Dilated 1D Convolutions," 2019 IEEE Automatic Speech Recognition and Understanding Workshop (ASRU), 2019, pp. 54-61, doi: 10.1109/ASRU46091.2019.9003730. (Year: 2019).*

Li et al., "Dilated Residual Network with Multi-head Self-attention for Speech Emotion Recognition," ICASSP 2019—2019 IEEE International Conference on Acoustics, Speech and Signal Processing (ICASSP), 2019, pp. 6675-6679, doi: 10.1109/ICASSP.2019.8682154 (Year: 2019).*

Moritz et al., "Capturing Multi-Resolution Context by Dilated Self-Attention," ICASSP 2021—2021 IEEE International Conference on Acoustics, Speech and Signal Processing (ICASSP), 2021, pp. 5869-5873, doi: 10.1109/ICASSP39728.2021.9415001. (Year: 2021).*

L. Dong et al., "Self-Attention Aligner: A Latency-Control End-to-End Model for ASR Using Self-Attention Network and Chunk-Hopping", XP033565487.

Y. Shi et al., "Weak-Attention Suppression for Transformer Based Speech Recognition", XP081672359.

\* cited by examiner

ARTIFICIAL INTELLIGENCE SYSTEM FOR CAPTURING CONTEXT BY DILATED SELF-ATTENTION

TECHNICAL FIELD

The present disclosure generally relates to artificial intelligence (AI), and more specifically to an AI system for capturing context by dilated self-attention.

BACKGROUND

Nowadays, attention mechanism has become a central component in many Neural Network (NN) architectures for different artificial intelligence (AI) applications including machine translation, speech processing, language modeling, automatic speech recognition (ASR), computer vision, and the like. Further, self-attention mechanism is also a widely used neural network component. The self-attention mechanism allows inputs to interact with each other ("self") and find out who they should pay more attention to ("attention") to compute outputs in the best way for a given task. Outputs of the neural network components using such a self-attention mechanism are aggregates of these interactions.

Attention-based architectures (such as, transformer architecture) have been successfully applied for various domains where attention is utilized throughout all model components. A number of model parameters are increased to further improve results using deeper and wider architectures. The attention-based architectures process inputs of different lengths (also called as "input sequence length"). In general, computational complexity of the attention-based architecture depends upon the input sequence length. Also, the computational complexity of the self-attention mechanism grows quadratically with increase in the input sequence length. This can be problematic for applications such as, but not limited to, Automatic Speech Recognition (ASR), where the input sequence length of an utterance may be relatively long. The increase in the computational complexity of the neural networks results in low processing performance, such as increase in processing time, low processing speed, and increase in storage space.

To solve the problem of computational complexity in the neural networks, restricted self-attention mechanism may be used. However, the restricted self-attention mechanism ignores distant information relative to a query associated with the current query frame. Hence, output result of such a mechanism may be deteriorated.

Accordingly, there is a need for a technical solution to overcome the above-mentioned limitation. More specifically, there is need to provide high quality outputs, while minimizing computation cost (time and space requirement).

SUMMARY

Some embodiments are based on the recognition of an attention mechanism that is a method to read information from an input sequence by using a query frame (i.e., a query vector). The input sequence in such a mechanism acts as a memory. Further, in dilated self-attention mechanism, query frames computed from the input sequence are used to query information from itself. In an example embodiment, the input sequence may correspond to a sequence of observation vectors (frames) extracted from a speech utterance that contains a sequence of speech sound events. The self-attention mechanism may transform the frames of such an input sequence to a sequence of key frames, value frames, and query frames. In some embodiments, neighboring frames of a query frame, which corresponds to a frame position in the input sequence, may belong to a similar sound event as that of the query frame, where detailed information may be required to recognize their logical relation with one or more of the key frames, value frames, and query frames. Further, the distant information (such as frames in the input sequence that are far away from the query frame) may be relevant to recognize context of the input sequence. Therefore, the neighboring frames may have dependent relationship, while distant frames are relevant to trace the context which may require less detailed information.

In some example embodiments, such as in machine translation or language modeling, where each word is represented by an observation vector in the input sequence, close-by words of an input sequence may be more likely to have a dependent relationship, while only a few distant words or word groups may be relevant to trace the semantic context and syntax of a sentence, which may require less detailed information.

In some other example embodiments, in an automatic speech recognition (ASR) system, neighboring frames (or nearby frames) of a query frame may belong to the same phoneme, syllable, and word, where detailed information is required to recognize their coherency. On the other hand, distant information is relevant to recognize the context of sounds and words in an utterance and to adapt to speaker or recording characteristics, which typically require less fine-grained information. In some embodiments, a transformer-based neural network may be used for an end-to-end ASR system. The transformer-based neural network may be trained simultaneously with a frame-level classification objective function. In one example embodiment, the transformer-based neural network may be trained simultaneously with a connectionist temporal classification (CTC) objective. The transformer-based neural network may leverage both encoder-decoder attention and self-attention. The encoder-decoder attention may use a query vector based on the state of the decoder of the transformer-based neural network for controlling attention to a sequence of input values. The sequence of input values is a sequence of encoder neural network states. Both the attention types of the transformer-based neural network may be based on the scaled dot-product attention mechanism. The CTC objective implemented in the transformer-based neural network may achieve combined advantage of both the label-synchronous and time-synchronous models, while also enabling streaming recognition of encoder-decoder based ASR systems.

Some embodiments are based on the recognition of the problem that distant information relative to a query associated with the current query frame may be excluded in restricted self-attention mechanism. The restricted self-attention mechanism may allow attention to neighboring or nearby frames of the current query frame that are at a high resolution. That is, in the restricted self-attention mechanism, past and future context relative to the current query frame is limited based on a pre-defined number of look-back and look-ahead frames. However, the distant information may be useful in providing an accurate outcome.

Some embodiments are based on the recognition of recursive processing of the distant information to compute summarization frames up to the current query frame in order to determine the past (left) context relative to the query. In the recursive processing the summarization frames are updated with new input frames as the query moves forward. This process is executed till the last query frame is processed.

This iterative update of the information leads to determination of inaccurate distant context as the recursive processing proceeds since the original information of distant frames is decaying in the summarization frames. Also, the recursive processing cannot be parallelized in order to speed up the computation of the summarization frames.

To avoid such decaying of distant information and to obtain equal access to distant information in the past (left-context) as well as to the future (right-context) relative to a current query frame, it is an objective of some embodiments, to accurately summarize the distant context without using a recursive approach. To that end, it is an objective of some embodiments to provide a dilation mechanism in addition to the restricted self-attention. The combination of the dilation mechanism and restricted self-attention is termed dilated self-attention. In the dilation mechanism, the sequence of value frames and the sequence of key frames, which are both derived from the input sequence, are extracted and stored into a value dilation sequence and a key dilation sequence. The dilation mechanism may be using parallel computing to simultaneously compute the frames of the key dilation sequence and the frames of the value dilation sequence. The key dilation sequence and the value dilation sequence may be of lower frame rate compared to the sequence of key frames and the sequence of value frames.

Thus, the dilated self-attention, which combines the restricted self-attention with the dilation mechanism, performs self-attention at full resolution to nearby frames of the query that are within the look-ahead and look-back range of the restriction window and at reduced resolution to distant frames that may be outside of the restriction window. In some example embodiments, the dilation mechanism of the dilated self-attention subsamples or summarizes the sequences of key and values frames of an input sequence. The summarized key and values frames may be used as the dilation sequences. The dilation sequences of the key and values frames may correspond to a lower frame rate compared to the frame rate of the input sequence. The dilation sequences of the key and values frames may be appended to the restricted sequences of key and values frames generated by the restricted self-attention mechanism. In this manner, the full context of the input sequence is captured in parts at high (full) resolution and at lower resolution for providing an accurate self-attention output. The information of the high and lower resolution may be in a compressed form, which may consume less memory and less computational time for processing an input sequence for applications related to machine translation, language modeling, speech recognition, or the like.

Some embodiments are based on recognition that the relevant information from the sequence of inputs, i.e., the input sequence, may be extracted or compressed within a chunk of frames based on different frame rate reduction methods such as subsampling as well as pooling methods that extract or compress the relevant information within a chunk of frames. Examples of the frame reduction methods may include, but are not limited to, mean-pooling, max-pooling, attention-based pooling, and the like.

In some embodiments, the relevant information within the chunk of frames are extracted or compressed by an attention-based pooling approach. The attention-based pooling method uses trained embedding vectors to obtain one or multiple query vectors that are used to compute a weighted average of the chunks.

In some embodiments, the relevant information from the sequence of inputs may be extracted using block processing, subsampling, and compression techniques. In such an approach, distant frames relative to a current query frame are processed at lower resolution and neighboring frames relative to a current query frame are processed at high (full) resolution. The distant information and the nearby information may be combined to obtain a compressed form of the sequence of inputs. Different embodiments use different predetermined extraction functions to extract information from all available/relevant key and value frames. Different extraction functions use one or combination of abovementioned extraction techniques to combine the restricted self-attention with other useful info captured by the dilated self-attention.

Further, some embodiments are based on the recognition that the computational complexity of the self-attention mechanism grows quadratically with increase in an input sequence length. Accordingly, it is an objective of some embodiments to alleviate the quadratic computational cost growth of the self-attention with the input sequence length. In accordance with an embodiment, the computational cost of the restricted self-attention in the dilated self-attention system grows only linearly with the input sequence length. The computational costs for attending to a dilation sequence are by a factor M smaller compared to full-sequence based self-attention, where M denotes the subsampling or the chunk size of the pooling operation.

Thus, the overall complexity of the dilated self-attention mechanism is significantly smaller as compared to the full-sequence based self-attention mechanism, while the full context of an input sequence is still captured with different resolutions in the dilated self-attention mechanism.

Accordingly, one embodiment discloses an artificial intelligence (AI) system for explaining inputs in a sequence of inputs jointly by exploring mutual dependence of the inputs on each other, the AI system comprising: at least one processor; and memory having instructions stored thereon that, when executed by the at least one processor, cause the AI system to: accept a sequence of input frames; process the sequence of input frames with a neural network including at least one dilated self-attention module trained to compute from the sequence of input frames a corresponding sequence of outputs by transforming each input frame of the sequence of input frames into a corresponding query frame, a corresponding key frame, and a corresponding value frame leading to a sequence of key frames, a sequence of value frames, and a sequence of query frames of similar ordering and by performing attention calculations for each query frame in the sequence of query frames with respect to a combination of a portion of the sequences of key and value frames restricted based on a location of the query frame in the sequence of query frames and a dilation sequence of the key frames and a dilation sequence of value frames extracted by processing different frames of the sequences of key and value frames with a predetermined extraction function; and render the sequence of outputs.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
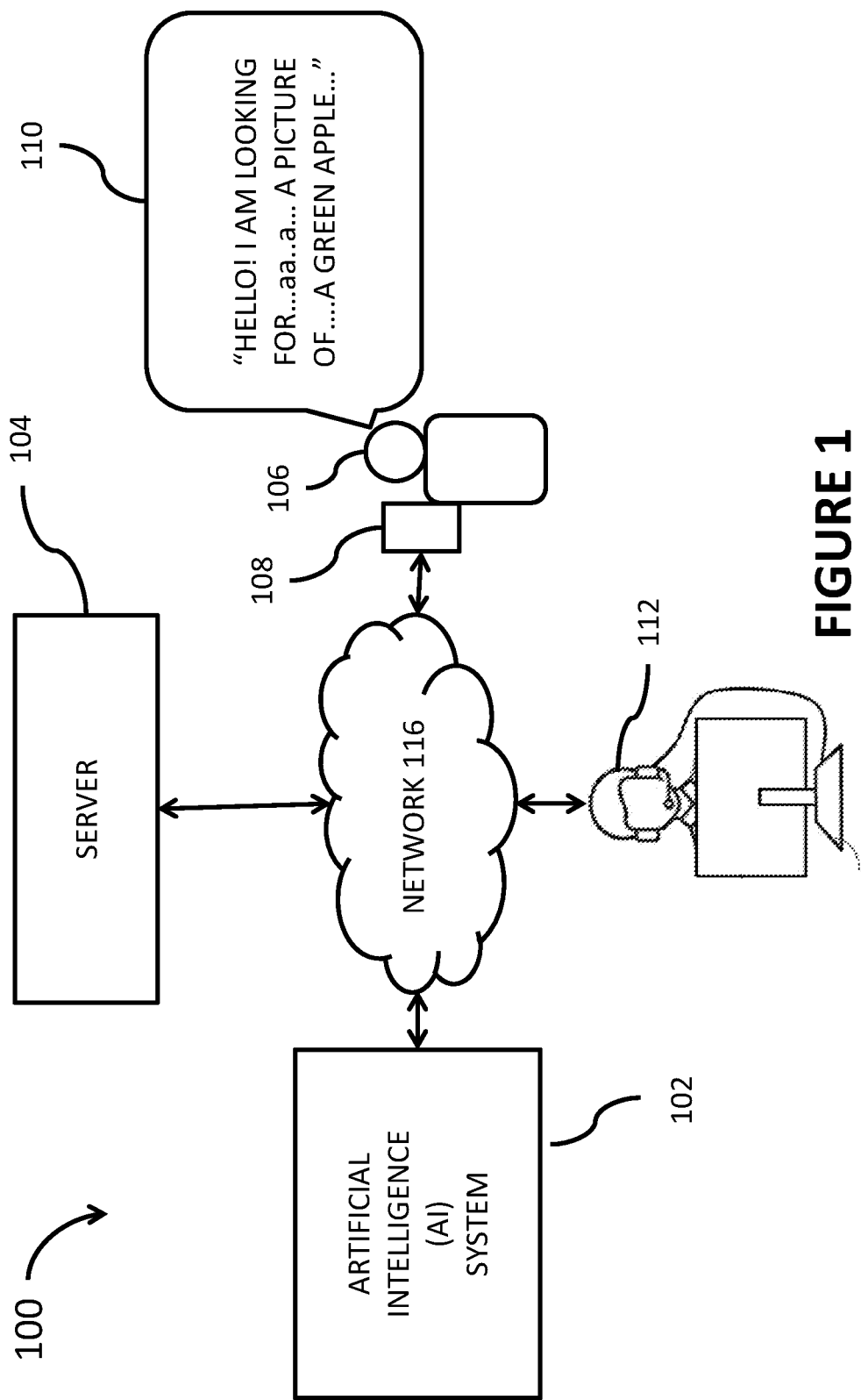
FIG. 1 is a block diagram that illustrates a network environment for implementing an Artificial Intelligence (AI) system, according to some embodiments of the present disclosure.

FIG. 1 is a block diagram that illustrates a network environment 100 for implementing an Artificial Intelligence (AI) system 102, according to some embodiments of the present disclosure. The network environment 100 is depicted to include a user 106 associated with a user device 108. In an illustrative example scenario, the user 106 provides an input, such as an input 110 to the user device 108. The user device 108 may receive the input 110 as an acoustic signal or as a speech utterance. The user device 108 may include an application, such as automatic speech recognition (ASR) or automatic machine translation (AMT) application hosted by a server 104. The input 110 may be provided to the server 104, via a network 116. The server 104 may be configured to process the input 110 to execute different operations (such as operations related to the ASR and AMT applications). In an example embodiment, the user 106 may be providing the input 110 as an audio input (also called as audio input 110) related to a technical problem that may be resolved by a technical solution provider 112. The technical solution provider 112 may include, but not limited to, a human representative, a virtual bot, and an interactive voice response (IVR) system. The server 104 receives from the user device 108 and transfers the audio input 110 to the technical solution provider 112, via the network 116.

Further, the network 116 may include suitable logic, circuitry, and interfaces that may be configured to provide a plurality of network ports and a plurality of communication channels for transmission and reception of data. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 116 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 116 may include, but is not limited to, a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), Wireless Area Network (WAN), Wireless Wide Area Network (WWAN), a Long Tenn Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

In some embodiments, the audio input 110 may be lengthy. In such cases the computational complexity of the server 104 may be high. Accordingly, the server 104 may not process the audio input 110 accurately and/or timely, which may result in generating inaccurate output. Also, processing the lengthy audio input 110 may take time, which results into delayed responses to the user inputs. Further, the server may also suffer backlogs because the server takes more time in processing the lengthy audio input 110.

To that end, high quality outputs for the audio input 110 (with low computational cost) may be generated using the AI system 102, which is explained next with reference to FIG. 2.

Figure 2:
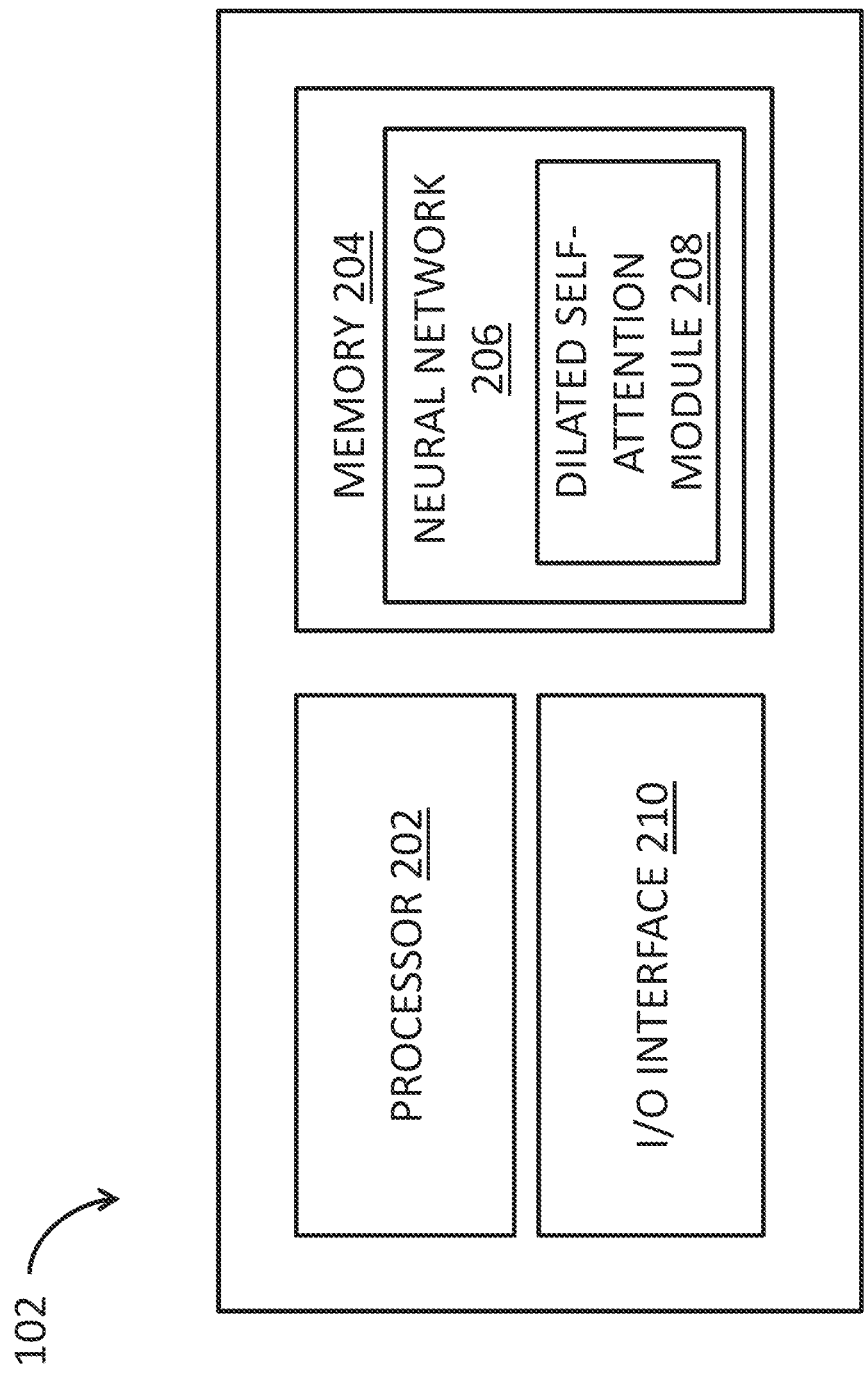
FIG. 2 is a block diagram of the AI system, exemplarily illustrated in FIG. 1, according to some embodiments of the present disclosure.

FIG. 2 is a block diagram of the AI system 102, exemplarily illustrated in FIG. 1, according to some embodiments of the present disclosure. The AI system 102 explains inputs in a sequence of inputs jointly by exploring mutual dependence of the inputs on each other. The AI system 102 includes a processor 202, a memory 204 and an input/output (I/O) interface 210. The memory 204 has a neural network 206 that includes a dilated self-attention module 208. In some embodiments, the neural network 206 may include multiple layers of a plurality of dilated self-attention modules.

In an example embodiment, the I/O interface 210 is configured to receive a sequence of inputs, where the sequence of inputs may correspond to an audio input (such as the audio input 110) having a temporal dimension. Further, the processor 202 is configured to execute instructions stored in the memory 204. The execution of the stored instructions causes the AI system 102 to accept a sequence of input frames denoting a sequence of ordered features describing information of an input signal (such as the audio input 110). Further, the sequence of input frames is processed with the neural network 206 including the dilated self-attention module 208 that is trained to compute a corresponding sequence of outputs from the sequence of input frames.

Some embodiments are based on the realization that the input signal may include a sequence of input frames, which are transformed into a sequence of keys, values, and queries. Each query frame of the sequence of queries searches over the sequence of keys to compute the relationship of each key frame relative to the query frame. Each key frame is related to a value frame that encodes features about each input frame. The estimated relationship of each key frame relative to the query frame is used to assign a weighting factor to each value frame for computing the weighted average of the sequence of value frames and an output for the query search. For example, if each input frame of the sequence of input frames corresponds to a word in a sequence of words, i.e., a sentence, the estimated relationship of each key frame relative to a query frame would denote the relationship of the word associated with the query frame to all other words in the sentence.

Further, some embodiments are based on the realization that relation of queries to keys and keys to values is differentiable. That is, an attention mechanism can learn to reshape the relationship between a search word and the words providing context as the network learns.

Accordingly, in some embodiments, the processor 202, via the neural network 206, processes the sequence of input frames by transforming each input frame of the sequence of input frames into a corresponding query frame, a corresponding key frame, and a corresponding value frame leading to a sequence of key frames, a sequence of value frames, and a sequence of query frames of the same ordering. In some embodiments, a location of the query frame in the sequence of query frames corresponds to a location in the sequences of key and value frames.

Further, the processor 202, via the neural network 206, performs attention calculations for each query frame in the sequence of query frames with respect to a combination of a portion of the sequences of key and value frames and a dilation sequence of the key frames and a dilation sequence of value frames. The portion of the sequences of key and value frames is determined based on a location or position of the query frame in the sequence of query frames.

To this end, the dilated self-attention module 208 is trained to compute the sequence of outputs from the sequence of input frames based on learned transforms and a sequence of attention calculations. The sequence of attention calculations allows mapping the sequence of value frames to an output by using a current query frame and a sequence of key frames. In some example embodiments, the dilated self-attention module 208 provides an attention mechanism to read information from the sequence of inputs by using the current query frame where the current query frame corresponds to a query vector.

The dilated self-attention module 208 is further caused to compare different query frames of the sequence of query frames with different representations of the sequence of key frames. The comparison between the different query frames and the different representations of the key frames produces different weight distributions over the different representations of the sequence of value frames. The different weight distributions are used to compute the weighted averages of the different representations of value frames, which form the sequence of outputs of the output. The different sequence representations of the key and values frames are formed by combining a subsequence of the key and value frames with a compressed or subsampled sequence of the key and value frames. In some embodiments, the subsequence of the key and value frames may be selected based on a location of the current query frame as well as the compressed or subsampled sequence of key and value frames.

In some embodiments, neighboring frames of the current query frame of the sequence of inputs can be utilized to provide information (hereinafter, "associated information") related to the current query frame. The associated information from the neighboring frames may include similar elements as that of the current query frame or a stronger relationship to the current query frame. In such cases, detailed information may be required to recognize a logical relation of the elements of the associated information with elements of the current query frame. Accordingly, some embodiments are based on the recognition that frames that are neighboring to the current query frame may have more likely a dependent relationship.

Further, frames in the sequence of inputs that are distant from the current query frame may provide distant information that may be relevant to recognize context of the sequence of inputs. Accordingly, some embodiments are based on recognition that the distant neighboring frames may be relevant to trace context related to explaining the sequence of inputs.

For instance, for speech recognition, the neighboring frames of the current query frame may correspond to the same phoneme, syllable or word. The distant information may be relevant to recognize the context of sounds and words in an utterance and to adapt to speaker or recording characteristics, which typically requires less fine-grained information. For machine translation, neighboring words to the current query frame may have more likely a dependent relationship, while only a few distant words or word groups may be relevant to trace the semantic context and syntax of a sentence, which may require less detailed information.

To determine the context and syntax of the sequence of inputs, a dilation sequence of key frames and a dilation sequence of value frames are produced by the AI system 102. To that end, the processor 202 executes a non-recursive sequence compression of the sequences of key and value frames. In particular, the processor 202 utilizes the dilated self-attention module 208 to process the entire temporal dimension of the sequence of input frames including the sequences of key and value frames at a same time. In such a case, the output of each frame is independent of other frames. Thus, original information carried by each frame is processed and the accurate context and syntax of the sequence of inputs is determined.

Further, in some implementations, the non-recursive sequence compression of the sequence of key and value frames is achieved by applying an extraction, e.g., compression, technique to all of the frames of the sequence of key and value frames in a parallel manner. Accordingly, the computational complexity of the self-attention process is reduced as well as the self-attention process is extended to a sequence processing with different attention resolutions. Thus, dilated mechanism can efficiently summarize different features of each frame of the sequence of key and value frames and provides reduction in the computational complexity of the neural network 206. The neural network 206 trained with such a dilation mechanism provides a low computational complexity for producing a sequence of outputs. Accordingly, processing speed of the processor 202, utilizing such a neural network, is increased which results in fast response time of the AI system 102. Hence, the AI system 102 disclosed in the present disclosure facilitates output in faster manner. Further, the processor 202 renders the sequence of outputs via the I/O interface 210.

In an embodiment where the neural network 206 includes multiple neural network layers with dilated self-attention modules, a dilation mechanism is performed independently for each dilated self-attention module at each layer of the neural network.

In another embodiment, the dilated self-attention module 208 sequentially applies multiple dilation mechanisms to produce multiple dilation sequences for the keys and values on a process pipeline. In particular, the processor 202 produces a first dilation sequence for the key frames and for the value frames and a second dilation sequence for the key frames and for the value frames sequentially on the process pipeline. In such a case, the first dilation sequence of the key frames and of the value frames rendered by a first dilation mechanism with a first chunk size forms the input to a second dilation mechanism with a second chunk size to render the second dilation sequence of the key frames from the first dilation sequence of the key frames and the second dilation sequence of the value frames from the first dilation sequence of the value frames. In this way, dilation sequences of different frames rates, i.e., different resolutions, can be obtained.

Figure 3A:
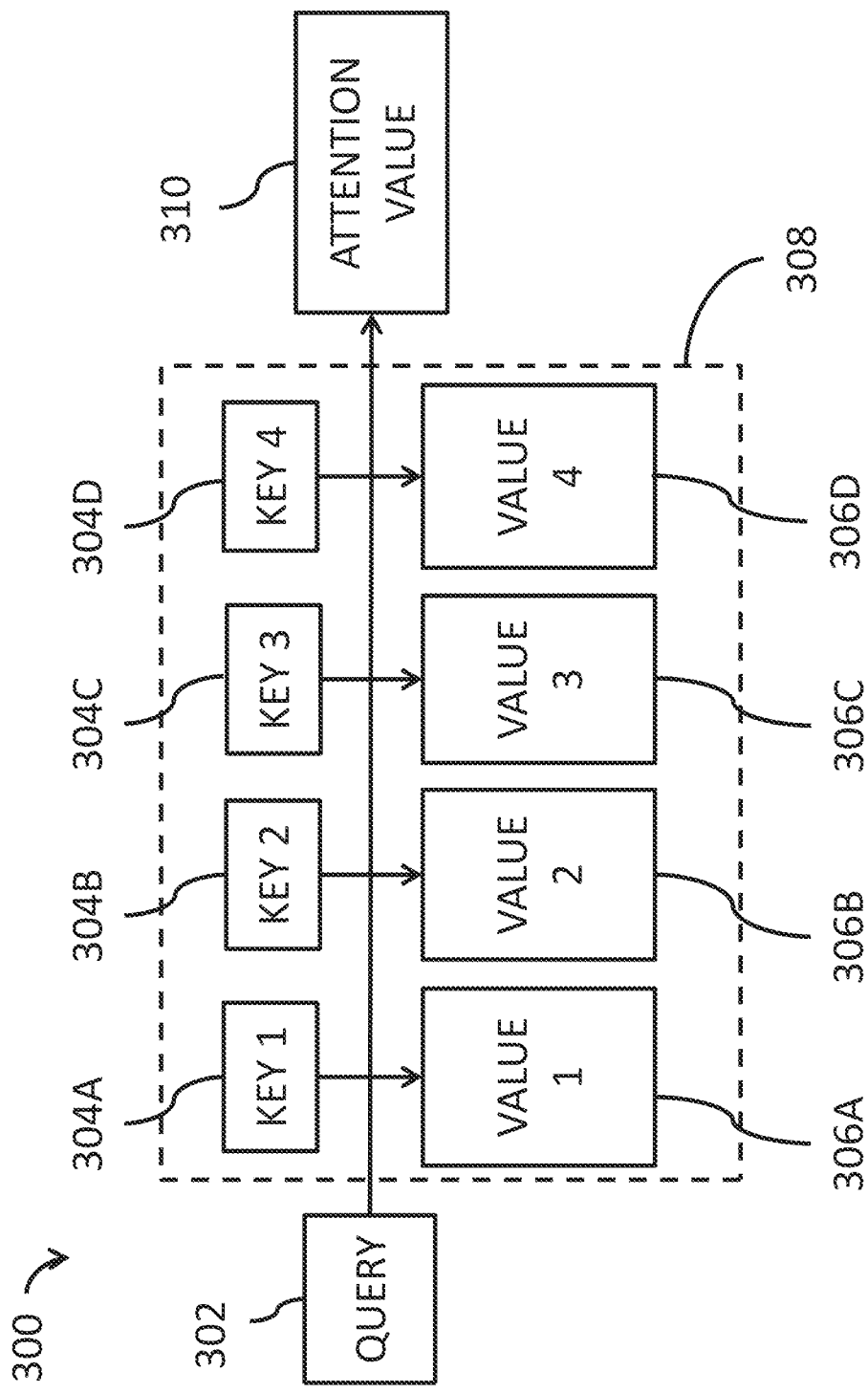
FIG. 3A is a diagrammatic representation depicting attention mechanism of a dilated self-attention module of the AI system, according to one example embodiment of the present disclosure.

FIG. 3A is a diagrammatic representation 300 depicting principles of attention mechanism used by some example embodiments. For example, the dilated self-attention module 208 can use the principles of the attention mechanism to read information from a sequence of inputs based on a current query frame, such as query 302. In an example embodiment, in an attention mechanism of the dilated self-attention module 208, an input of a source sequence 308 is initially transformed into key and value frames. The key and value frames may include a key frame 304A, a key frame 304B, a key frame 304C and a key frame 304D (also called as keys 304A-304D) with corresponding value frames 306A, 306B, 306C and 306D (also called as values 306A-306D). The source sequence 308 may correspond to a feature sequence derived from the audio input 110.

In an example embodiment, the dilated self-attention module 208 determines a similarity between the query 302 and each of the keys 304A-304D. The similarity is used for calculating an attention score for each of the values 306A-306D.

In some example embodiments, the attention score may be normalized based on a softmax function to compute the attention weight distribution. To that end, the dilated self-attention module 208 of the neural network 206 utilizes the softmax function such that non-normalized scores of the dilated self-attention module 208 are mapped to a probability distribution over the sequence of value frames. The softmax function is a function that turns a vector of K real values into a vector of K real values that sum to 1. The input values may be positive, negative, zero, or greater than one, but the softmax transforms them into values between 0 and 1, so that they can be interpreted as probabilities which sum to 1. Accordingly, inputs of the softmax function may be the dot-product score between query 302 and the keys 304A-304D, which are utilized to determine the attention scores. Each of the corresponding values 306A, 306B, 306C, and 306D are weighted according to the normalized attention scores, i.e., each of the values 306A, 306B, 306C and 306D is multiplied with the normalized attention scores. Further, the weighted values 306A-306D are summed up. The dilated self-attention module 208 determines an output vector, such as an attention value 310 based on a summation of the weighted values 306A-306D. The attention score for each of the corresponding values 306A, 306B, 306C and 306D is described further with reference to FIG. 3B.

Figure 3B:
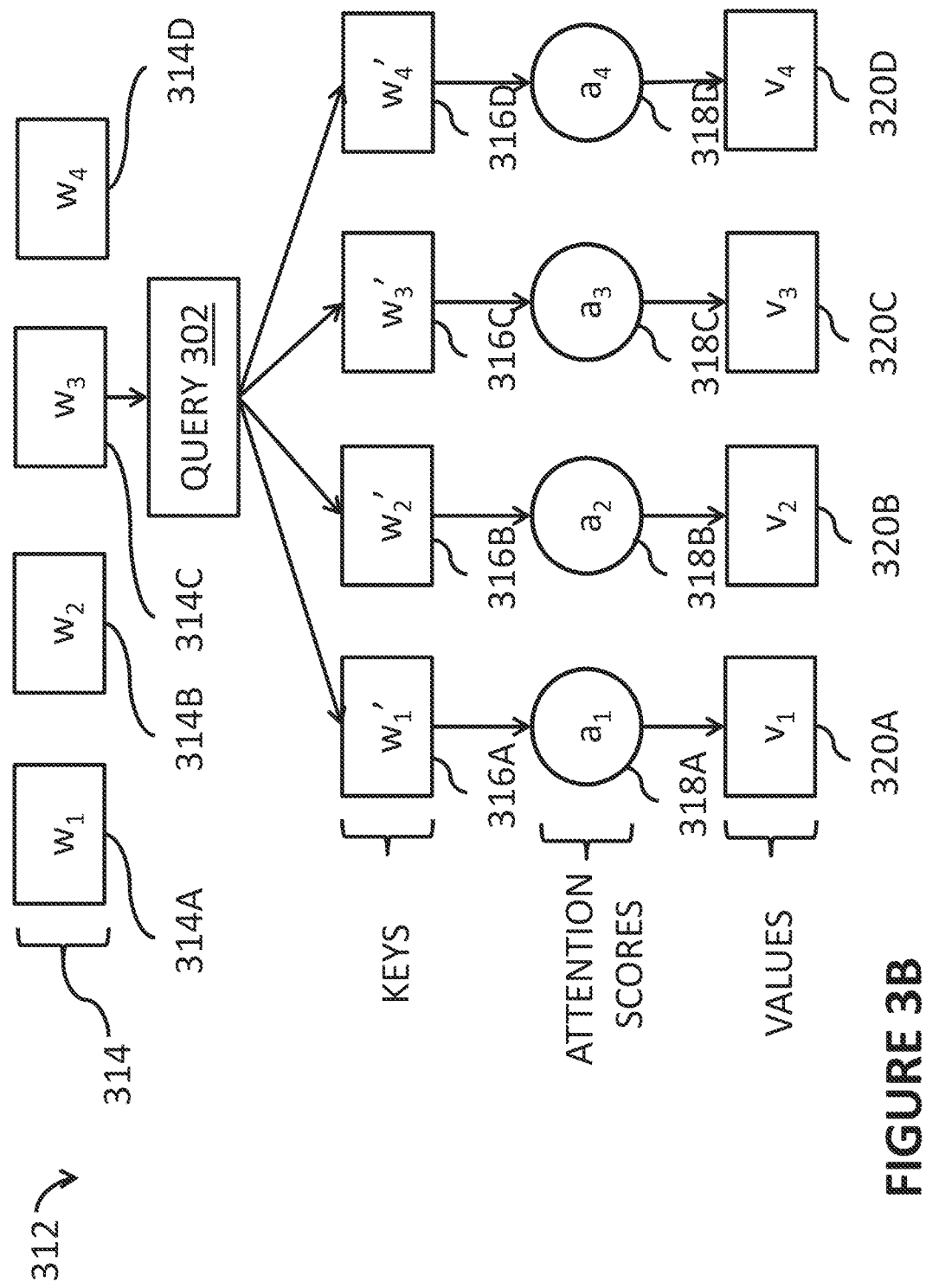
FIG. 3B is a diagrammatic representation depicting attention mechanism of the dilated self-attention module of the AI system, according to another example embodiment of the present disclosure.

FIG. 3B is a diagrammatic representation 312 depicting attention mechanism used by the dilated self-attention module 208 of the AI system 102, according to another example embodiment of the present disclosure. In an illustrative example scenario, the query 302 is selected from a sequence of inputs 314 by the AI system 102. The sequence of inputs 314 comprises input frames. In an example embodiment, each input frame may correspond to a word in the sequence of inputs 314, for example: words 314A ($w_1$), 314B ($w_2$), 314C ($w_3$) and 314D ($w_4$). The sequence of inputs 314 corresponds to the source sequence 308. The input word 314C ($w_3$) is selected as the query 302. Further, a set of keys 316A, 316B, 316C and 316D (also called as sequence of keys 316A-316D) and corresponding set of values 320A, 320B, 320C and 320D (also called as sequence of values 320A-320D) are generated by the AI system 102 for the sequence of inputs 314. The sequence of keys 316A-316D and the sequence of values 320A-320D correspond to the sequence of keys 304A-304D and the sequence of values 306A-306D.

The dilated self-attention module 208 determines attention scores for the sequence of values 320A-320D. In particular, an attention score 318A is determined for the value 320A, an attention score 318B is determined for the value 320B, an attention score 318C is determined for the value 320C, and an attention score 318D for the value 320D. The self-attention mechanism provided by the dilated self-attention module 208 is further described with reference to FIG. 4.

Figure 4:
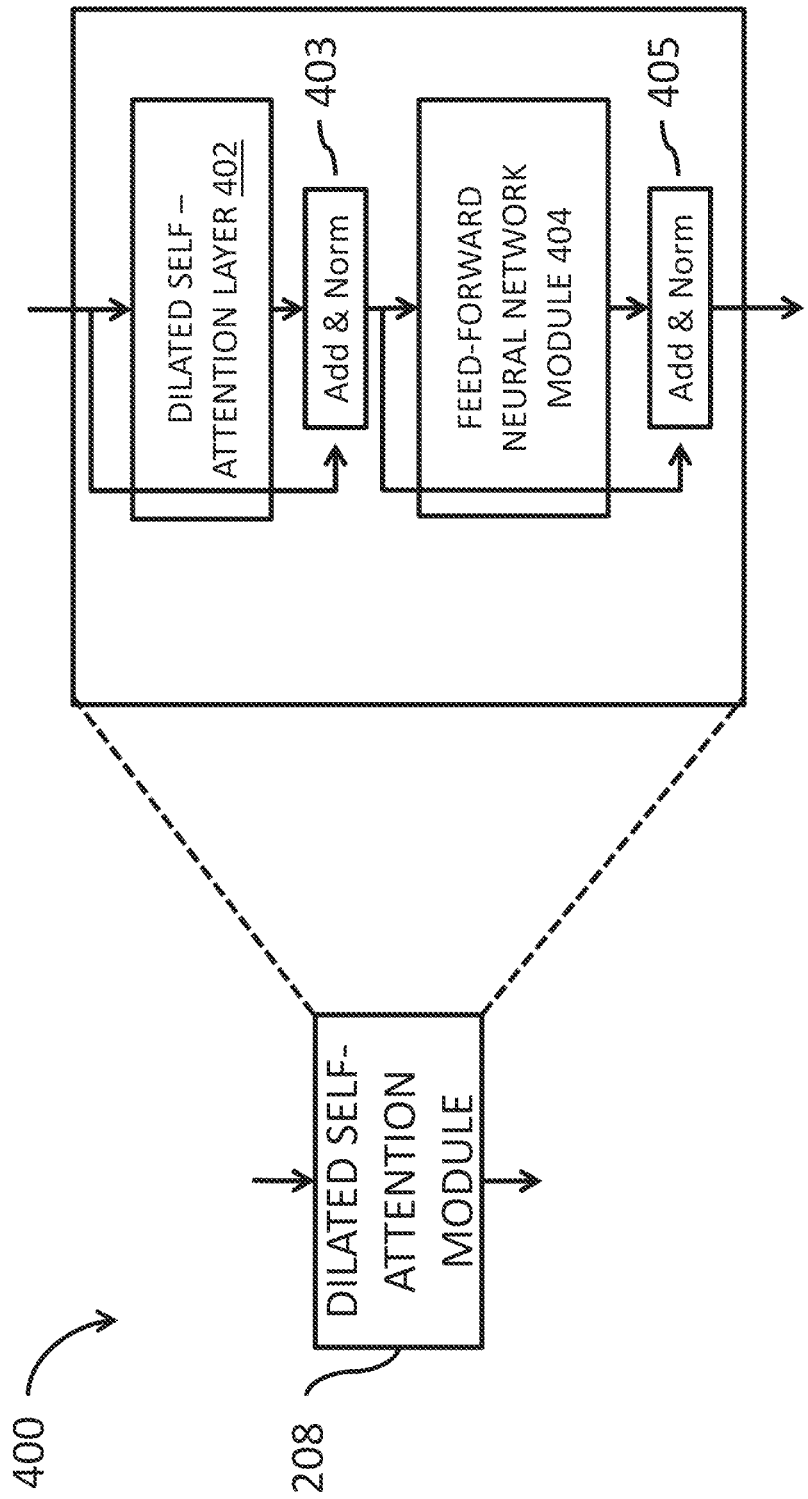
FIG. 4 is a block diagram of a dilated self-attention module of the AI system, according to some embodiments of the present disclosure.

FIG. 4 is a block diagram of the dilated self-attention module 208 of the AI system 102, according to one example embodiment of the present disclosure. In one embodiment, the dilated self-attention module 208 includes a self attention layer configured to perform the dilated self-attention. Additionally or alternatively, in some embodiments, the neural network 206 may include multiple layers of the dilated self-attention module, where each layer may correspond to the dilated self-attention module 208. For example, in one embodiment, the dilated self-attention module 208 contains one dilated self-attention layer 402 and one feed-forward neural network (FFN) module 404. Additionally or alternatively, in different embodiments, the self-attention module has different combinations of self-attention, residual, feed-forward, and other layers specific to the task. The dilated self-attention subnetwork 402 learns information relationships in a pairwise manner. For instance, the dilated self-attention layer 402 learns logical relationships of input frames in the source sequence 308 for applications, such as automatic speech recognition (ASR) application, automatic machine translation (AMT) application, or the like. The dilated self-attention layer 402 and the feed-forward neural network module 404 are both followed by the "Add & Norm" layers 403 and 405, respectively. The "Add & Norm" layer 403 first adds the input of the dilated self-attention layer 402 to the output of that layer using a residual connection and applies a layer normalization afterwards. Similarly, the "Add & Norm" layer 405 first adds the input of the feed-forward neural network module 404 to its output and then also applies a layer normalization.

In an example scenario, the dilated self-attention layer 402 receives an input sequence S represented by $S \in \mathbb{R}^{L \times C}$ with L and C denoting the sequence length and the frame/vector dimension. The dilated self-attention subnetwork 402 translates S into a sequence of keys (K), queries (Q) and values (V) via linear transforms. The sequence of self-attention outputs (such as the attention value 310) is computed by the weighted summation of the sequence of values V, where attention weights are derived by comparing each query frame of sequence Q with each value frame of sequence V. For the sequence of keys K, queries Q, and values V, the attention outputs (e.g., the attention value 310) may be calculated using the scaled dot-products as shown by equation (1)

$$\text{Attention}(Q, K, V) = \text{Softmax}\left(\frac{QK^T}{\sqrt{d_k}}\right)V, \quad (1)$$

where $Q \in \mathbb{R}^{n_q \times d_q}$, $K \in \mathbb{R}^{n_k \times d_k}$, and $V \in \mathbb{R}^{n_v \times d_v}$ are the queries, keys, and values, and where the d* denote dimensions and the n* denote sequence lengths, $d_q = d_k$, and $n_k = n_v$.

In an example application, the sequence of inputs 314 corresponds to a sequence of word embeddings for the sentence "She eats green apples". Each word of the sequence of inputs 314, i.e. "She", "eats", "green" and "apples", is converted into an embedding vector using a lookup table that is trained together with the other neural network modules. In the self attention mechanism used by the exemplar implementation of the dilated self-attention module 208, the vectors are multiplied by matrices to create a query 302, a key (e.g., the keys 316A-316D), and a value (e.g., the values 320A-320D) for each of the word embeddings 314A-314D. An attention score (e.g., the attention scores 318A-318D) is calculated by taking the dot-product of the query 302 and the sequence of keys 316A-316D of the respective sequence of inputs 314. For example, attention scores of the first word "She" are calculated by comparing it to all other words in the sentence using the dot-product between the query corresponding to the word "She" and the keys of all words 316A-316D. After the attention scores are normalized so that they sum to 1 using a softmax function, the estimated attention weights could be "She":0.05, "eats":0.8, "green": 0.05, "apples":0.1, where we denote weights for each word after the colon. These weights are applied to the sequence of values 320A-320D before summing them to form an output vector. Similarly, attention scores for each of the remaining words of the sequence of inputs, i.e. for "eats", "green" and "apples", are calculated by comparing the corresponding queries against all keys of the sentence of keys 316A-316D and summing the sequence of values 320A-320D with the corresponding weights. In this manner, the dilated self-attention module 208 transforms the sequence of inputs 314 into a sequence of outputs by using the sequence of query frames, the sequence of key frames 316A-316D, and the sequence of value frames 320A-320D. The dilated self-attention module 208 compares different query frames of the sequence of query frames with different representations of the key frames and value frames to produce the sequence of outputs of an output.

To combine the restricted self-attention with the dilated self-attention, in some embodiments, the different representations of the key frames and value frames are formed by using a subset of key frames 316A-316D and the corresponding value frames 320A-320D. The subset of key and values frames may be selected based on a location of the current query frame 302. In addition, a dilation mechanism may be applied to the sequence of key frames and the sequence of value frames to compute the dilation sequences for the key frames and for the value frames.

In some embodiments, the dilated self-attention layer 402 corresponds to a multi-head attention that is used in a transformer-based neural network of the AI system 102, which is described next with reference to FIG. 5.

Figure 5:
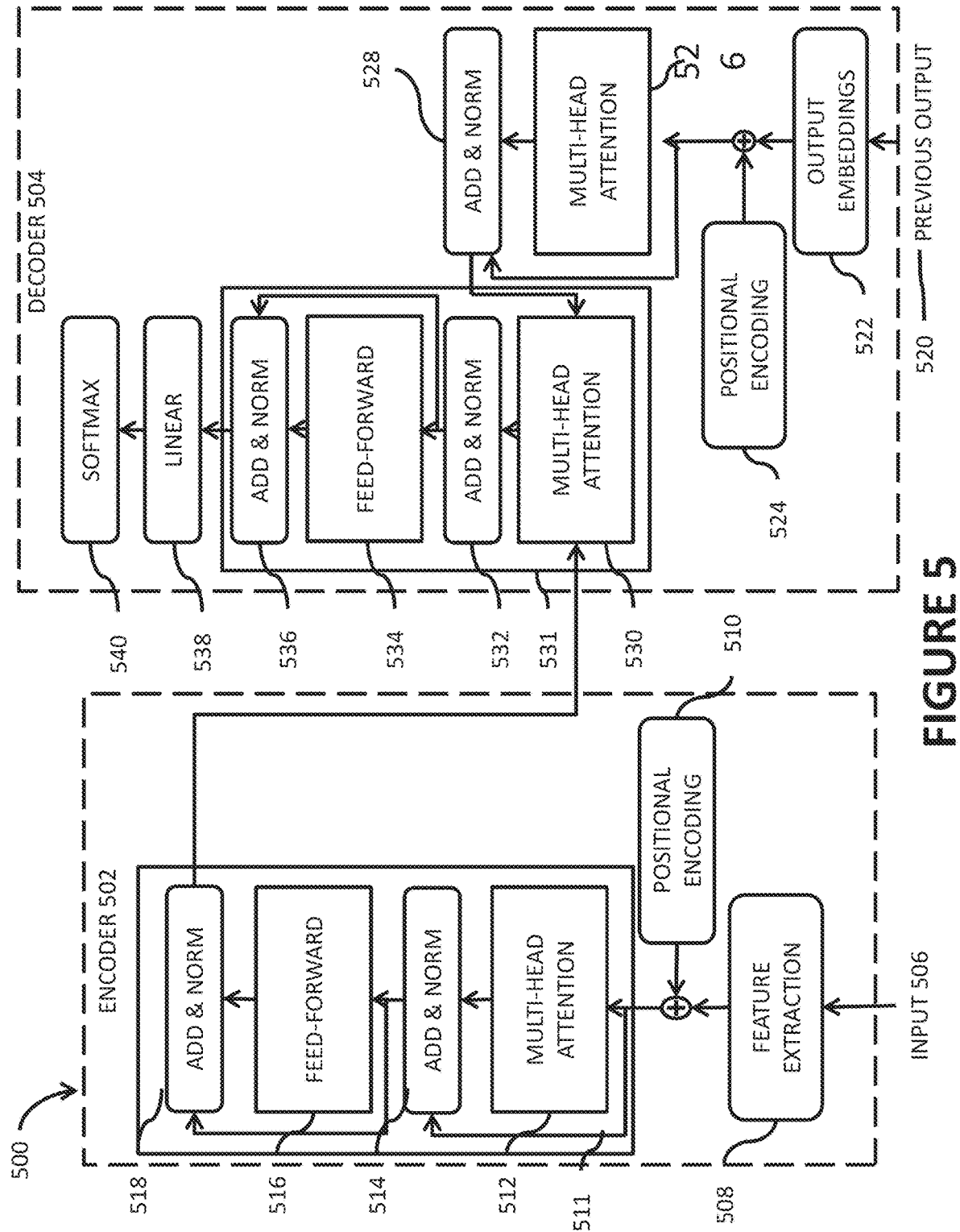
FIG. 5 is a block diagram that illustrates a transformer-based neural network of the AI system, according to some embodiments of the present disclosure.

FIG. 5 is a block diagram that illustrates a transformer-based neural network 500 of the AI system 102, according to some embodiments of the present disclosure. In some example embodiments, the transformer-based neural network 500 may leverage an attention-based encoder-decoder neural network, e.g. encoder 502 and decoder 504. In such attention-based encoder-decoder neural network, a decoder state may be used as a query (e.g., the query 302) for controlling attention to a sequence of encoder states of the encoder 502. The sequence of encoder states may correspond to the sequence of outputs of encoder 502. The transformer-based neural network 500 may also leverage the dilated self-attention module 208. In some embodiments, the transformer-based neural network 500 may comprise a plurality of the dilated self-attention modules. In some example embodiments, the transformer-based neural network 500 leveraging the encoder-decoder based attention, such as for the encoder 502 and the decoder 504, as well as the dilated self-attention. The attention calculations of both may be based on the scaled dot-product attention, where attention is computed based on the equation (1) as described above in description of FIG. 4. Further, the transformer-based neural network 500 may comprise multiple layers of dilated self-attention based neural network modules.

In some example embodiments, the transformed-based neural network 500 uses the multi-head attention mechanism with $$\text{MHA}(\hat{Q},\hat{K},\hat{V}) = \text{Concat}_j(\text{Head}_1, \ldots, \text{Head}_{d_h})W^H \quad (2)$$

and Head$_i$=Attention($\hat{Q}W_i^Q, \hat{K}K_i^K, \hat{V}W_i^V$), (3)

where, $\hat{Q}$, $\hat{K}$, and $\hat{V}$ are inputs to the multi-head attention (MHA) layer, e.g. the multi-head attention 512 of the encoder 502, the multi-head attention 526 and the multi-head attention 530 of the decoder 504. Head$_i$ represents the output of the i-th attention head for a total number of d$_h$ heads and $W_i^Q \in \mathbb{R}^{d_{model} \times d_q}$, $W_i^K \in \mathbb{R}^{d_{model} \times d_k}$, $W_i^V \in \mathbb{R}^{d_{model} \times d_v}$ and well as $W^H \in \mathbb{R}^{d_h d_v \times d_{model}}$ are trainable weight matrices with typically $d_k = d_v = d_{model}/d_h$, and Concat$_f$ denotes concatenation along the feature dimension of size d$_v$.

In some example embodiments, the encoder 502 may comprised of a two-layer Convolutional Neural Network (CNN) module (ENCCNN) (included in 508) and a stack of self-attention modules 511 (ENCSA) or dilated self-attention modules 208):

$$X_0 = ENCCNN(X) + PE, \quad (4)$$

$$X_E = ENCSA(X_0), \quad (5)$$

where PE are sinusoidal positional encodings and $X = (x_1, \ldots, x_T)$ denotes the sequence of inputs 314, e.g., acoustic input features such as 80-dimensional log-mel spectral energies plus extra features for pitch information. Both CNN layers of ENCCNN may use a stride of size 2, a kernel size of 3×3, and a ReLU activation function. Thus, the striding may reduce frame rate of output sequence $X_0$ by a factor of 4 compared to the frame rate of feature sequence X. The ENCSA module of equation (5) consists of E layers, where the $e^{th}$ layer, for e=1,. . .,E, is a composite of a multi-head dilated self-attention layer (e.g., the multi-head attention 512):

$$X_e^1 = \text{Norm}(X_{e-1} + MHA_e(X_{e-1}, X_{e-1}, X_{e-1})), \quad (6)$$

$$X_e = \text{Norm}(X_e^1 + FF_e(X_e^1)), \quad (7)$$

and a feed-forward neural network layer (FF), e.g., the feed-forward layer 516, where Norm (as in 514) denotes layer normalization. In some example embodiments, the feed-forward neural network consists of two linear neural network layers of inner dimension $d_{ff}$ and outer dimension $d_{model}$ that may be separated by a rectified linear unit (ReLU) activation function as follows:

$$FF_e(X_e^1) = \text{ReLU}(X_e^1 W_{e,1}^{ff} + b_{e,1}^{ff})W_{e,2}^{ff} + b_{e,2}^{ff} \quad (8)$$

where $W_{e,1}^{ff} \in \mathbb{R}^{d_{model} \times d_{ff}}$, $E_{e,2}^{ff} \in \mathbb{R}^{d_{ff} \times d_{model}}$, $b_{e,1}^{ff} \in \mathbb{R}^{d_{ff}}$, and $b_{e,2}^{ff} \in \mathbb{R}$ are trainable weight matrices and bias vectors. The transformer-based neural network 500 may provide a transformer objective function, which is defined as $$P_{att}(Y|X_E) = \Pi_{l=1}^L p(y_l|y_{1:l-1}, X_E) \quad (9)$$

with label sequence $Y = (y_1, \ldots, y_L)$, label subsequence $y_{1:l-1} = (y_1, \ldots, y_{l-1})$ and the encoder output sequence $X_E = (x_1^E, \ldots, x_N^E)$. The term $p(y_l|y_{1:l-1}, X_E)$ represents the transformer decoder model, which may be written as $$p(y_l|y_{1:l-1}, X_E) = DEC(X_E, y_{1:l-1}), \quad (10)$$

with $z_{1:l}^0 = EMBED((s), y_1, \ldots, y_{l-1}) + PE, \quad (11)$ $$\overline{z}_l^d = \text{Norm}(z_l^{d-1} + MHA_d^{self}(z_l^{d-1}, z_{1:l}^{d-1}, z_{1:l}^{d-1})), \quad (12)$$

$$\overline{\overline{z}}_l^d = \text{Norm}(\overline{z}_l^d + MHA_d^{dec}(\overline{z}_l^d, X_E, X_E)), \quad (13)$$

-continued $$z_l^d = \text{Norm}(\overline{\overline{z}}_l^d + FF_d(\overline{\overline{z}}_l^d)), \quad (14)$$

for d=1,. . ., D, where D denotes the number of decoder layers in the decoder 504. EMBED is a function that converts the input label sequence $((s), y_1, \ldots, y_{l-1})$ into a sequence of trainable embedding vectors $z_{1:l}^0$, where (s) denotes start of sentence symbol. PE denotes positional encodings. DEC is a function that predicts posterior probability of label $y_l$ by applying a fully-connected neural network to $z_l^D$ and a softmax distribution over the output.

The positional encoding 510 and positional encoding 524 are sinusoidal positional encodings (PE) of dimension $d_{seq}$ that are added to the sequences $X_0$ and $Z_0$, which are of similar dimension, and which may be written as $$PE(pos, 2i) = \sin(pos/1000^{2i/d_{seq}}), \quad (15)$$

$$PE(pos, 2i+1) = \cos(pos/1000^{2i/d_{seq}}), \quad (16)$$

where pos and i are position and dimension indices of $X_0$ and $Z_0$.

In some embodiments, the transformer-based neural network 500 may be trained jointly with a frame-wise classification objective function, e.g. the connectionist temporal classification (CTC) loss. An objective function of the CTC is:

$$P_{ctc}(Y|X_E) = \Sigma_{\pi B^{-1}(Y)} p(\pi|X_E), \quad (17)$$

where $B^{-1}$ denotes a one-to-many map to expand the label sequence Y to a set of all frame-level label sequences using transition rules of the CTC (e.g., transition between labels and the insertion of the blank label). $\pi$ represents a frame-level label sequence. Finally, the multi-objective loss function is given by:

$$L = -\gamma \log p_{ctc} - (1-\gamma) \log p_{att} \quad (18)$$

The loss function, L is used for training, where $\gamma$ is a hyper parameter that controls weighing between the objective functions $p_{ctc}$ and $p_{att}$.

Further, the multi-head attention layers and the feed-forward layers in the encoder 502 and the decoder 504 are followed by an "add & norm" layer, which first adds the input of the respective layer to its output using a residual connection and then a layer normalization is applied. For instance, the multi-head attention 512 is connected to the feed-forward layer 514 through an "add & norm" layer 518. In a similar manner, the multi-head attention 526 is connected to the feed-forward layer 532 through an "add & norm" layer 530. The feed-forward layer 516 applies two linear transforms to the outputs of the "add & norm" layer 514, where the linear transforms are separated by an activation function, e.g., a rectified linear unit (ReLU). The outputs of the feed-forward layer 516 are sent through another "add & norm" layer, which again applies a residual connection to the output followed by a layer normalization. The encoder layers 512, 514, 516, and 518 are repeated E-times (without sharing parameters), where layer 518 provides the input to layer 512, before the output of the last encoder layer 518 is passed to the multi-head attention layer 530 of the decoder 504. As an additional input, the multi-head attention layer 530 receives the previous decoder output tokens 520, which are used to compute a decoder state by processing them through the layers 522, 524, 526, and 528. Layer 522 converts the previously output tokens 520 into embeddings vectors that are input to the multi-head attention layer 526 after positional encodings are added by layer 524. The output of layer 526 is further processed as discussed before using an "add & norm" layer. The output of the multi-head attention layer 530 is provided to the feed-forward layer 534 through the "add & norm" layer 532. The output of the feed-forward layer 534 is further processes by another "add & norm" layer 536. The decoder layers 526, 528, 530, 532, 534, and 536 are applied D times (without sharing parameters) in this ordering, where the output of layer 536 is input to layer 526 after the first application. Finally, after applying the decoder layers D times, the output of layer 536 is forwarded to the linear layer 538, a fully connected neural network layer, that projects the output vectors of the decoder 504 to a score for each of the output tokens. The output of the linear layer 538 is provided to a softmax layer 540 to convert the decoder scores to probabilities for each output token of the decode 504.

In some embodiments, the self-attention module 511 of the transformer-based encoder neural network 502 is substituted by the dilated self-attention module 208. In such a setup, dilated self-attention with multiple heads is performed at every of the E transformer-based encoder layers instead of self-attention in order to perform self-attention with multiple resolutions and to save computational costs.

Some embodiments are based on the recognition that distant information relative to a current query frame (e.g., the query 302) may be useful in providing an accurate outcome. To that end, the dilated self-attention module 208 provides a self-attention mechanism that allows attention to neighboring frames of the current query frame that include distant information relevant in capturing accurate context of the sequence of inputs 314. In some embodiments, the dilation mechanism of the dilated self-attention module 208 may summarize the distant information that includes the relevant information. Some embodiments are based on recognition that the relevant information from the sequence of inputs may be extracted or compressed within a chunk of frames, which are further explained with reference to FIGS. 6A-6C.

Figure 6A:
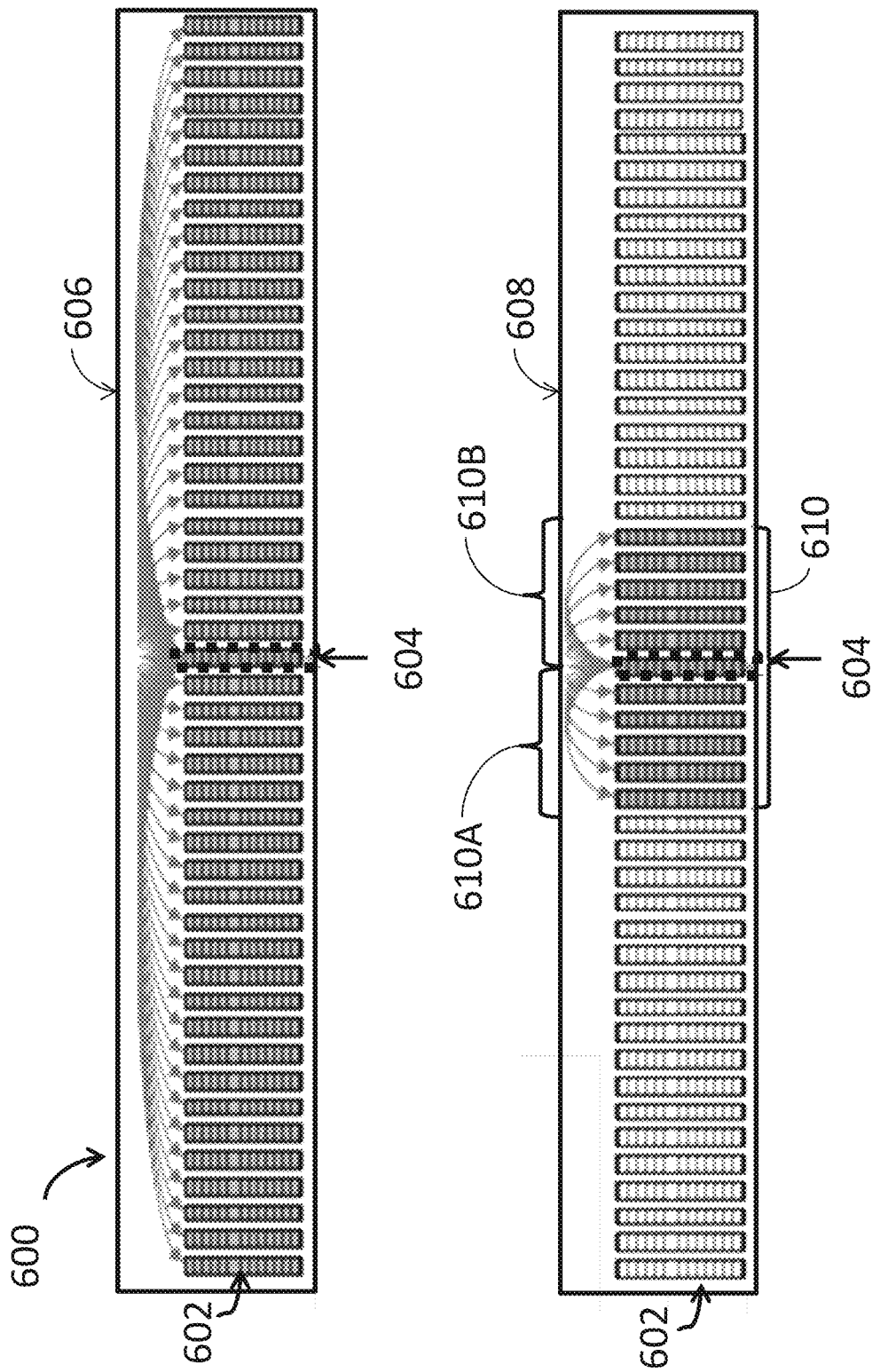
FIG. 6A is a diagrammatic representation depicting compression of a set of key-value frames of a sequence of inputs, according to one example embodiment of the present disclosure.

FIG. 6A is a diagrammatic representation 600 depicting a sequence of input frames 602 to the self-attention, according to one example embodiment of the present disclosure. The sequence of input frames 602 may correspond to the sequence of inputs 314. In some example embodiments, a query frame, such as a current query frame 604 is obtained from the sequence of inputs. In the full-sequence based self-attention 606, attention connections of all neighboring frames of the current query frame 604 are allowed, as shown in FIG. 6A. However, connecting all the neighboring frames with the current query frame 604 may increase computing complexity. To that end, a restricted self-attention 608 may be used to reduce the computing complexity.

In the restricted self-attention 608, nearby frames surrounding the current query frame 604 are used for self-attention. These neighboring frames may correspond to past and future context information relative to the current query frame 604. In some embodiments, the dilated self-attention module 208 may be configured to execute a selection function that selects a subset of input frames (e.g., neighboring frames of the current query frame 604) from the sequence of inputs 602 based on a location of the current query frame 604 to form a portion of a representation of the sequence of inputs 602. The selection function accepts the location of the input as a parameter and returns the neighboring frames 610A and 610B in the sequence of inputs 602. The selection function may also accept a value for the look-ahead size and for the look-back size to form a window size around the current query frame for selecting the neighboring frames 610A and 610B. In some embodiments, the window may be a time-restricted window. The selection function may limit the usage of neighboring frames of the full resolution sequence of inputs 602. In some embodiments, the selection function may correspond to a restriction window 610 for selecting the subset of input frames. In an example embodiment, the selected subset of input frames may correspond to a fixed number of look-back frames 610A and look-ahead frames 610B. The look-back frames 610A may include the past (left) context and the look-ahead frames 610B may include the future (right) context of the sequence of inputs 602 relative to the query 604.

However, the restricted self-attention 608 excludes the distant information relative to the current query frame 604. The exclusion of the distant information in the restricted self-attention 608 may deteriorate the outcome. To that end, the restricted self-attention 608 may be combined with a dilation mechanism to provide a dilated self-attention, which is described next with reference to FIG. 6B.

Figure 6B:
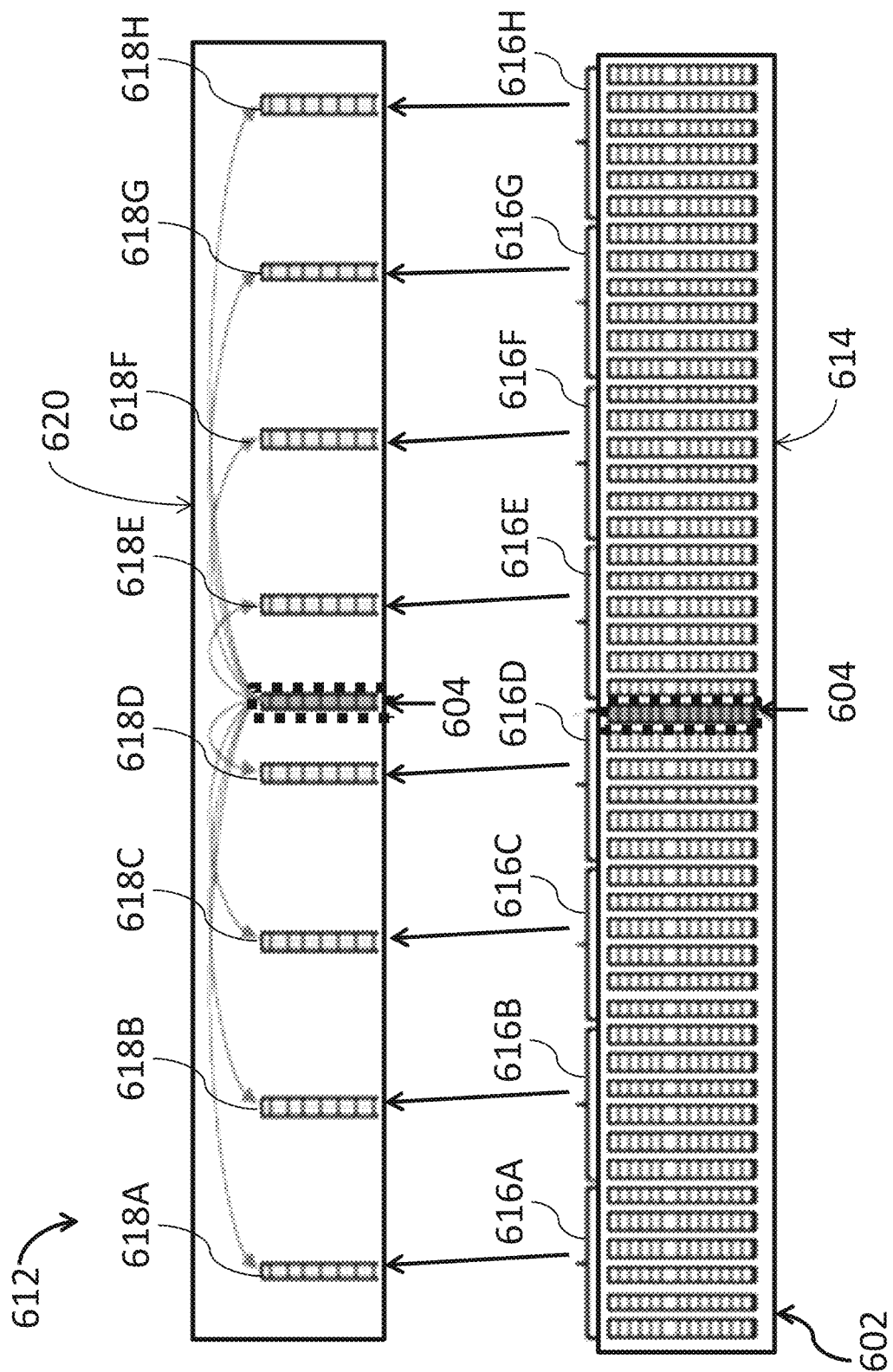
FIG. 6B is a diagrammatic representation depicting the compression of the set of key-value frames of the sequence of inputs, according to another example embodiment of the present disclosure.

FIG. 6B is a diagrammatic representation 612 depicting the compression of the sequence of inputs 602, according to another example embodiment of the present disclosure. In some embodiments, the dilated self-attention module 208 provides a dilation mechanism 612 combined with the restricted self-attention 608.

In the dilation mechanism 612, the sequence of inputs 602 may be summarized to form a compression of the sequence of key frames and the sequence of value frames (e.g., the sequence of keys 316A-316D and the sequence of values 320A-320D). For instance, the sequence of key frames and the sequence of the value frames in the sequence of inputs 602 may be partitioned, via at least one processor (such as the processor 202), into a sequence of into a sequence of key chunks and a sequence of value chunks such as chunks 616A, 616B, 616C, 616D, 616E, 616F, 616G and 616H (also called as chunks 616A-616H), where each key chunk includes multiple key frames and each value chunk includes multiple value frames. In some example embodiments, the dilated self-attention module 208 is configured to partition the sequence key frames and the sequence of value frames with a predetermined frequency. Further, each of the chunks 616A-616H may be summarized into dilation frames 618A, 618B, 618C, 618D, 618E, 618F, 618G and 618H (also called as summaries 618A-618H). The dilation frames 618A-618H provide a compressed form (dilation sequence 620) corresponding to the set of keys 316A-316D and the corresponding values 320A-320D. In an example embodiment, the dilation mechanism at the e-th encoder layer first splits the keys $K_i = X_{e-1} W_i^K = (k_1^i, \ldots, k_N^i)$ and values $V_i = X_{e-1} W_i^V = (v_1^i, \ldots, v_N^i)$ each of length N, cf. Eq. (3), into $L = \lfloor \frac{N}{M} \rfloor$ non-overlapping key chunks $C_{i,l}^K$ and value chunks $C_{i,l}^V$ each of length M, such that $$C_{i,l}^V = (v_{M(l-1)+1}^i, \ldots, v_{M(l-1)+M}^i),$$
$$C_{i,l}^K = (k_{M(l-1)+1}^i, \ldots, k_{M(l-1)+M}^i),$$

for $l=1,\ldots,L$, where the last chunks, $C_{i,L}^V$ and $C_{i,L}^K$, for the attention heads indexed with $i=1,\ldots,d_h$ may be padded with zeros if they have fewer than M frames.

Further, the at least one processor applies a predetermined function to each of the key chunks and to each of the value chunks in order to compress the multiple key frames of a key chunk into a smaller predetermined number of key frames of same dimensionality for the dilation sequence of key frames and to compress the multiple value frames of a value chunk into the smaller predetermined number of value frames of same dimensionality for the dilation sequence of value frames. In some embodiments, the at least some of the key chunks and some of the value chunks are compressed concurrently using parallel computation processes such that a high processing speed of the processor is achieved.

The examples of the predetermined function include, but not limited to, one or a combination of a sampling function, an average-pooling function (also called as mean-pooling), a max-pooling function, an attention-based pooling, and a convolutional neural network (CNN)-based pooling.

More specifically, the subsampling or pooling techniques, as the predetermined function, are applied to each chunk to generate dilation sequences $\Delta_i^K$ and $\Delta_i^V$ that are appended to the restricted sequence of key frames and the restricted sequence of value frames, respectively, by modifying Eq. (3) as follows:

$$\text{Head}_{i,n,e} = \text{Attention}(x_n^{e-1} W_i^Q, \overline{K}_{i,n,e}, \overline{V}_{i,n,e})$$

with $\overline{K}_{i,n,e} = \text{Concat}_t(k_{n-v_{lb}:n+v_{la}}, \Delta_i^K)$, and $\overline{V}_{i,n,e} = \text{Concat}_t(v_{n-v_{lb}:n+v_{la}}, \Delta_i^K)$, for n=1,. . . ,N, where $v_{lb}$ and $v_{la}$ denote the number of look-back and look-ahead frames for the time-restriction, which corresponds to a window size of $R = v_{lb} + v_{la} + 1$, and $\text{Concat}_t$ denotes concatenation along the time dimension (frames).

In some embodiments, the subsampling-based dilation mechanism selects the first frame of each chunk to form the dilation sequences $\Delta_i^K = (k_1^i, \ldots, k_{M(l-1)+1}^i, \ldots, k_{M(L-1)+1}^i)$ and $\Delta_i^V = (v_1^i, \ldots, v_{M(l-1)-1}^i, \ldots, v_{M(L-1)+1}^i)$. In alternative embodiments, pooling methods are applied to summarize the information content of each chunk such as the sampling function, the mean-pooling (MP), the max-pooling, the CNN based pooling, attention-based pooling (AP) or attention-based pooling with post-processing (AP+PP).

In some embodiments, the CNN-based dilation mechanism is applied, where the CNN-based pooling applies convolution with trained weights and a kernel size similar to the chunk size to the sequence of key frames and to the sequence of value frames.

In some embodiments, the max-pooling based dilation mechanism is applied, where the max-pooling function selects a single key frame of maximum energy from the multiple key frames in the key chunk and selects the corresponding frame from the multiple value frames in the value chunk.

In some embodiments, the sampling function based dilation mechanism is applied, where the sampling function selects a single frame from the multiple key frames of the key chunk and a corresponding frame from the multiple value frames of the value chunk. In the subsampling and the max-pooling functions, a single key frame from a chunk of key frames is selected and a corresponding value frame from a chunk of value frames and information contained by other frames is ignored.

In some embodiments, a mean-pooling based dilation mechanism is applied, where frames in each chunk of key frames and value frames are averaged to the mean vectors according to $$\mu_{i,l}^{[V,K]} = \frac{1}{M} \sum_m C_{i,l}^{[V,K]}[m],$$

for l=1,. . . ,L, where the notation [V,K] denotes the processing of either the value frames or the key frames. This notation is continued to be used in the following equations. The derived sequence of mean vectors for the sequence of key frames and the sequence of values frames is used to form the dilation sequences $$\Delta_i^{[V,K]} = (\mu_{i,1}^{[V,K]}, \ldots, \mu_{i,L}^{[V,K]}).$$

Figure 7A:
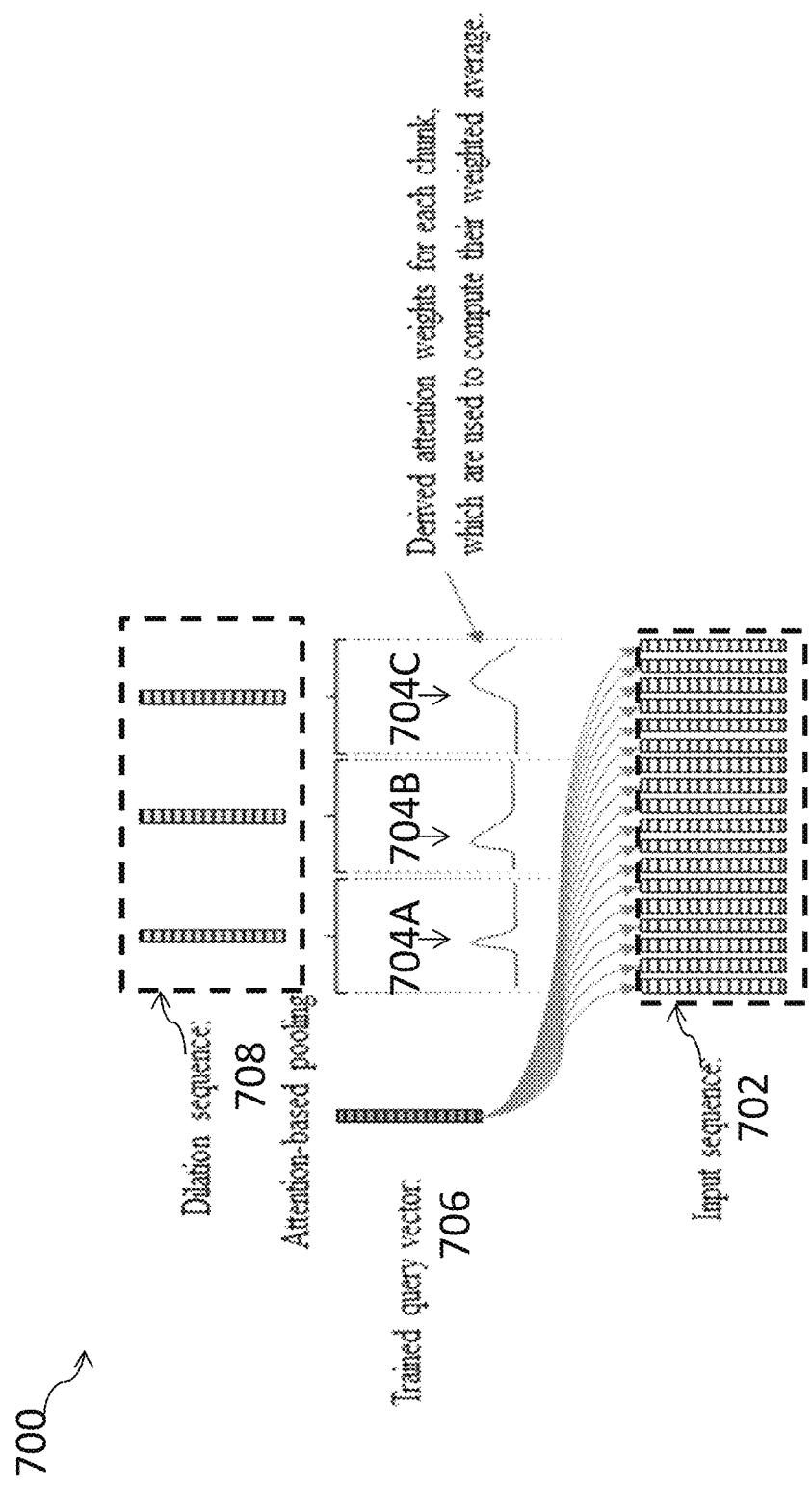
FIG. 7A illustrates an attention-based pooling, in accordance with some embodiments of the present disclosure.
Figure 7B:
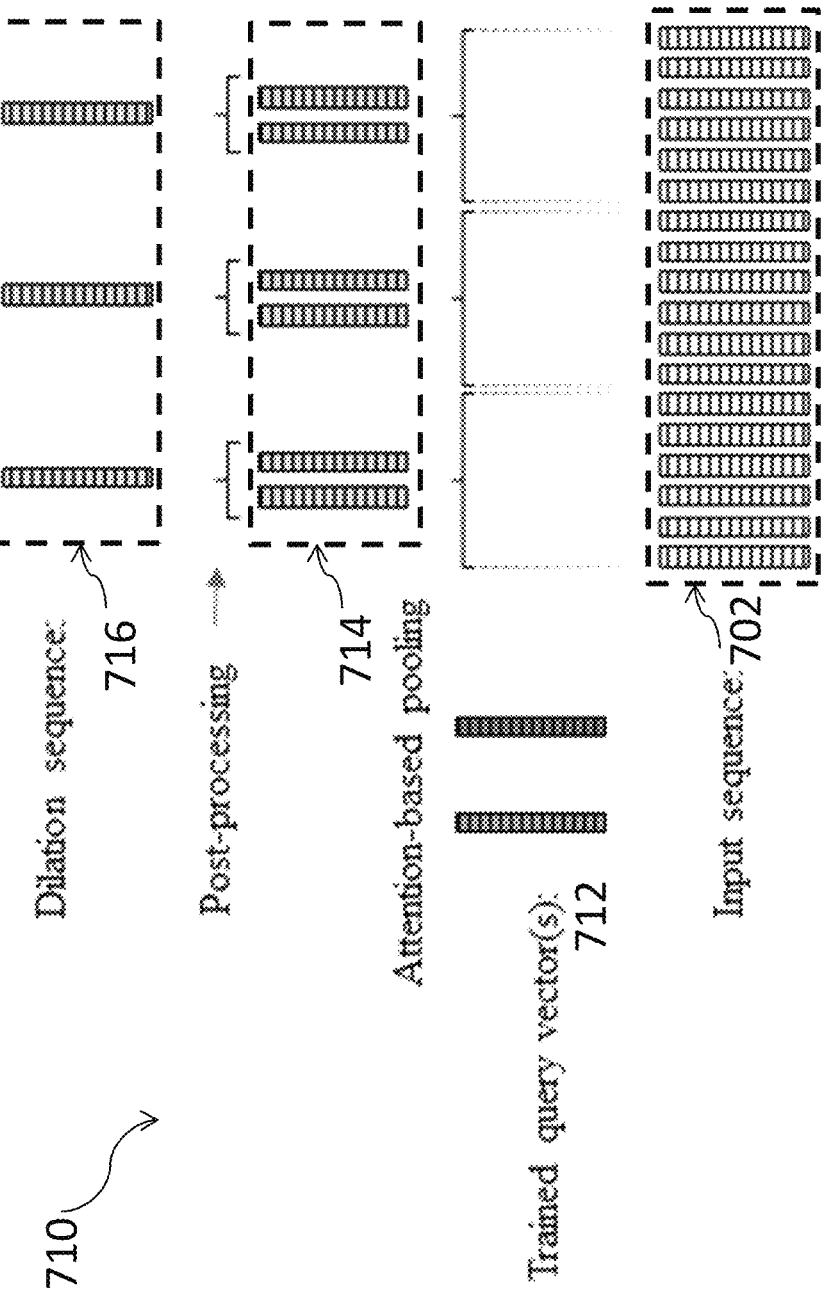
FIG. 7B illustrates the attention-based dilation with post processing, in accordance with some embodiments of the present disclosure.

In a preferred embodiment, attention-based pooling (AP) may be applied to summarize the information content of each chunk of key frames and value frames, which is described further with respect to FIGS. 7A and 7B.

Figure 6C:
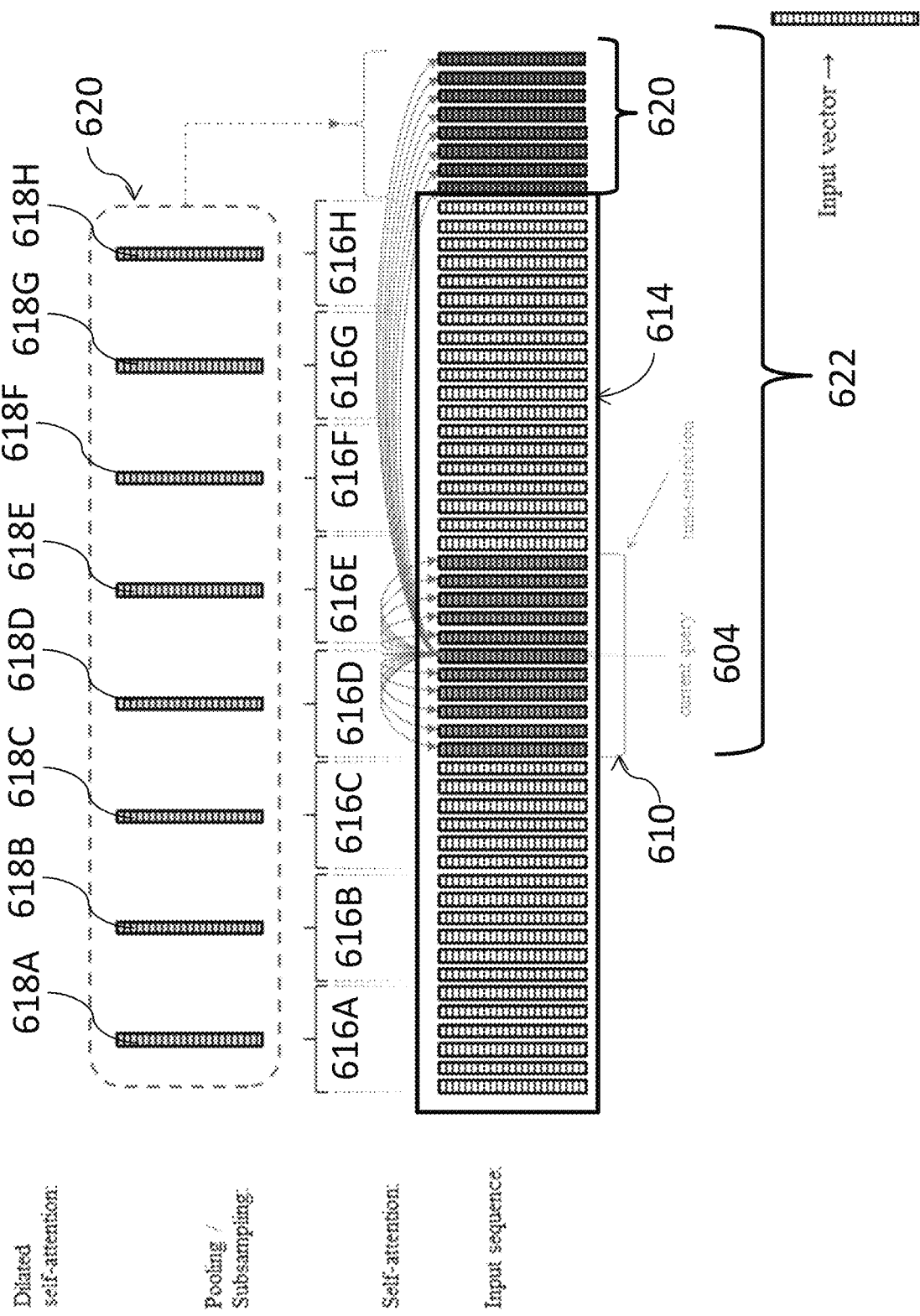
FIG. 6C illustrates an output sequence output by the AI system, in accordance with some embodiments of the present disclosure.

FIG. 6C illustrates an output sequence output by the AI system 102, in accordance with some embodiments of the present disclosure. FIG. 6C is described with reference to FIGS. 6A and 6B. The at least one processor (such as the processor 202), computes a sequence of outputs 622 by combining the portion of the sequences of key and value frames within the restriction window 610 with the dilation sequence 620 (i.e. the dilation sequence of the key frames and a dilation sequence of value frames), which is determined by a non-recursive sequence compression of the sequences of key and value frames in order to reduce the computational complexity of the self-attention process. The dilation sequence 622 corresponds to distant frames which adds context to the query frame and enables any system including the AI system 102 in providing accurate output with less processing time. Further, the at least one processor renders the sequence of outputs 622 via an output interface (such as the I/O interface 210).

FIG. 7A illustrates an attention-based pooling 700, in accordance with some embodiments of the present disclosure.

In the attention-based pooling (AP) 700, one or multiple trained query vectors (such as a trained query vector 706) are utilized to determine multiple weight distributions 704A, 704B, and 704C by attending to either a chunk of key frames or to a chunk of value frames from an input sequence 702. Accordingly, the attention-based pooling assigns a relevance to either the key frames in a chunk of key frames or to the value frames in the chunk of value frames to derive a weight distributions 704A, 704B, and 704C. Based on the multiple weight distributions 704A, 704B, and 704C, weighted averages of the chunk of key frames and of the chunk of value frames are computed.

In an example embodiment using the attention-based pooling, embedding vectors (e.g. the trained query vector 706) are learned that are used to query summary information from the key and value chunks by using an attention mechanism as follows:

$$g_{i,l}^{[V,K]} = B^{-1} \sum_{b=1}^{B} a_{i,b,l}^{[V,K]},$$

with $a_{i,b,l}^{[V,K]} = \text{Attention}(\overline{q}_b, C_{i,l}^K, C_{i,l}^{[V,K]})$, and $\overline{q}_b = \text{Embed}(b)$, for l=1,. . . ,L, where $\overline{q}_b^{[V,K]}$ represents a query, Embed(b) maps the attention head numbers b=(1,. . . ,B) to trainable vectors (e.g. trained query vector 706) of dimension $d_k$, and B denotes the total number of attention heads. The attention outputs $a_{b,l}^{[V,K]}$ are averaged along dimension b to derive $g_{i,l}^{[V,K]}$ to form the dilation sequences (e.g. dilation sequence 708) $\Delta_i^{[V,K]} = g_{i,1}^{[V,K]}, \ldots, g_{i,L}^{[V,K]})$.

In particular, a frame of the dilation sequence (such as the dilation sequence 708) for the sequence of key frames is computed as the weighted average of the chunk of key frames. Additionally or alternatively, a frame of the dilation sequence (such as the dilation sequence 708) for the sequence of values frames is computed as the weighted average of all the value frames for the chunk of value frames.

In some embodiments, attention-based dilation is performed along with post-processing techniques.

FIG. 7B illustrates the attention-based dilation with post processing 710, in accordance with some embodiments of the present disclosure.

Some embodiments are based on the realization that the application of post-processing techniques can refine the outputs of a system (e.g. the AI system 102). To that end, the output frames (such as multiple output frames 714) of the key chunk and of the value chunk are processed according to a post-processing rule to produce one or multiple frames 714 for dilation sequence of key frames and for the dilation sequence of value frames.

In order to derive the output frames 714 for the dilation sequence of key frames and the dilation sequence of value frames, the post-processing rule includes one or a combination of preserving the output frames 714 determined for the key chunk and for the value chunk, combining the output frames 714 determined for the key chunk and for the value chunk, and removing at least one of the output frames 714 determined for the key chunk and for the value chunk.

The post-processing rules can be adjusted for at least two different types of key and value chunks including a first type of key and value chunks with a distance smaller than a threshold to the query frame under the attention calculations and a second type of key and value chunks with a distance equal to or greater than a threshold to the query frame under the attention calculations.

In some other embodiments, where a neural network (such as the transformer-based neural network 500) includes a plurality of dilation mechanisms as part of the dilated self-attention module to produce at least two dilation sequences for the key frames and for the value frames. In such a setup, at least one processor (such as the processor 202) preserves the frames of the first dilation sequence for the key frames and for the value frames that correspond to key chunks and value chunks with a frame distance less than a predefined threshold relative to the query frame under the attention calculations. Further, the at least one processor also preserves the frames of the second dilation sequence for the key frames and for the value frames that correspond to key chunks and values chunks with a frame distance equal to or greater than a predefined threshold relative to the query frame under the attention calculations.

In some embodiments, at least one processor preserves the multiple output frames 714 determined for a first type of key and value chunks and removes at least one of the multiple frames 714 of the second type of key and value chunks.

In some alternative embodiments, the at least one processor, preserves the multiple frames 714 for the first type of key and value chunks and combines the multiple frames of the second type of key and value chunks using one or a combination of average-pooling and merging the multiple output frames 714 determined for the key chunk and for the value chunk by a neural network processing. The neural network processing includes use of two linear transforms with trained parameters that are separated by a non-linear activation function and with a bottleneck structure such that a first linear transform projects an input to a smaller dimensionality and a second linear transform projects an output of the first linear transform to the dimensionality of the query, key, and value frames.

For instance, the post-processing (PP) may be applied to $a_{i,l}^{[V,K]}$ to further process the attention-based pooling output and to effectively join the output of multiple attention heads using a two-layer feed-forward neural network of inner dimension $d_{in}$ and outer dimension $d_{[v,k]}$:

$$p_{i,l}^{[V,K]} = FF^{[V,K]}(a_{i,l}^{[V,K]}) + g_{i,l}^{[V,K]},$$

with $FF^{[V,K]}(a_{i,l}^{[V,K]}) =$ ReLU($\bar{a}_{i,l}^{[V,K]} W_1^{[V,K]} - b_1^{[V,K]})W_2^{[V,K]} + b_2^{[V,K]}$, and $\bar{a}_{i,l}^{[V,K]} = $Concatf$(a_{i,1,l}^{[V,K]}, \ldots, a_{i,B,l}^{[V,K]})$, where $W_1^{[V,K]} \in \mathbb{R}^{d_{[v,k]} B \times d_{in}}$, $W_2^{[V,K]} \in \mathbb{R}^{d_{in} \times d_{[v,k]}}$, $b_1^{[V,K]} \in \mathbb{R}^{d_{in}}$, and $b_2^{[V,K]} \in \mathbb{R}^{d_{[v,k]}}$ are trainable weight matrices and bias vectors and Concatf denotes concatenation of the vectors $a_{i,b,l}^{[V,K]}$ for $b=1,\ldots,B$ along the feature dimension. The post-processing results $p_{i,l}^{[V,K]}$ may be used to form the dilation sequences $$\Delta_i^{[V,K]} = (p_{i,1}^{[V,K]}, \ldots, p_{i,L}^{[V,K]}).$$

The combination of the restricted self-attention with the dilation mechanism reduces computational complexity of self-attention for long input sequences. The computational complexity estimation here is based on the number of floating-point multiplications of vector and matrix products, which is described by the M notation. For simplicity, we ignore in the estimation scalar multiplications as well as additions, since including these operations does not significantly change the relative complexities when comparing the different methods. The computational complexity of full-sequence based self-attention is $M(N^2 d_{model})$, where N denotes the length of the sequence of inputs (such as the sequence of inputs 702) and $d_{model}$ the attention model dimension. As can be noticed, the number of operations required for self-attention grows quadratically with the input sequence length. The complexity for restricted self-attention is $M(NRd_{model})$, where R is the size of the restriction window, which is usually significantly smaller than N, and thus requires less operations compared to full-sequence based self-attention. The computational complexity of dilated self-attention is $M(N(R+|_M^{N})d_{model}+\xi$ which includes the attention costs for restricted self-attention and for the appended dilation sequence plus the computational complexity of the dilation mechanism $\xi$. The computational complexity $\xi$ for the attention-based pooling mechanism amounts to $M(Nd_{model}B)$ for the dot-product attention of the learned queries $\bar{q}$ and the key chunks $C_l^K$, where the computed attention weights may be reused to summarize the value chunks $C_l^V$ as well. The computational complexity of post-processing amounts to $M(2(B+1)d_{model}d_{in}|N_M|)$ for post-processing the attention results of the keys and values chunks. In order to reduce the computational complexity, the feed-forward neural network FF of the post-processing stage may use a bottleneck of inner dimension $d_{in}=16$.

Figure 7C:
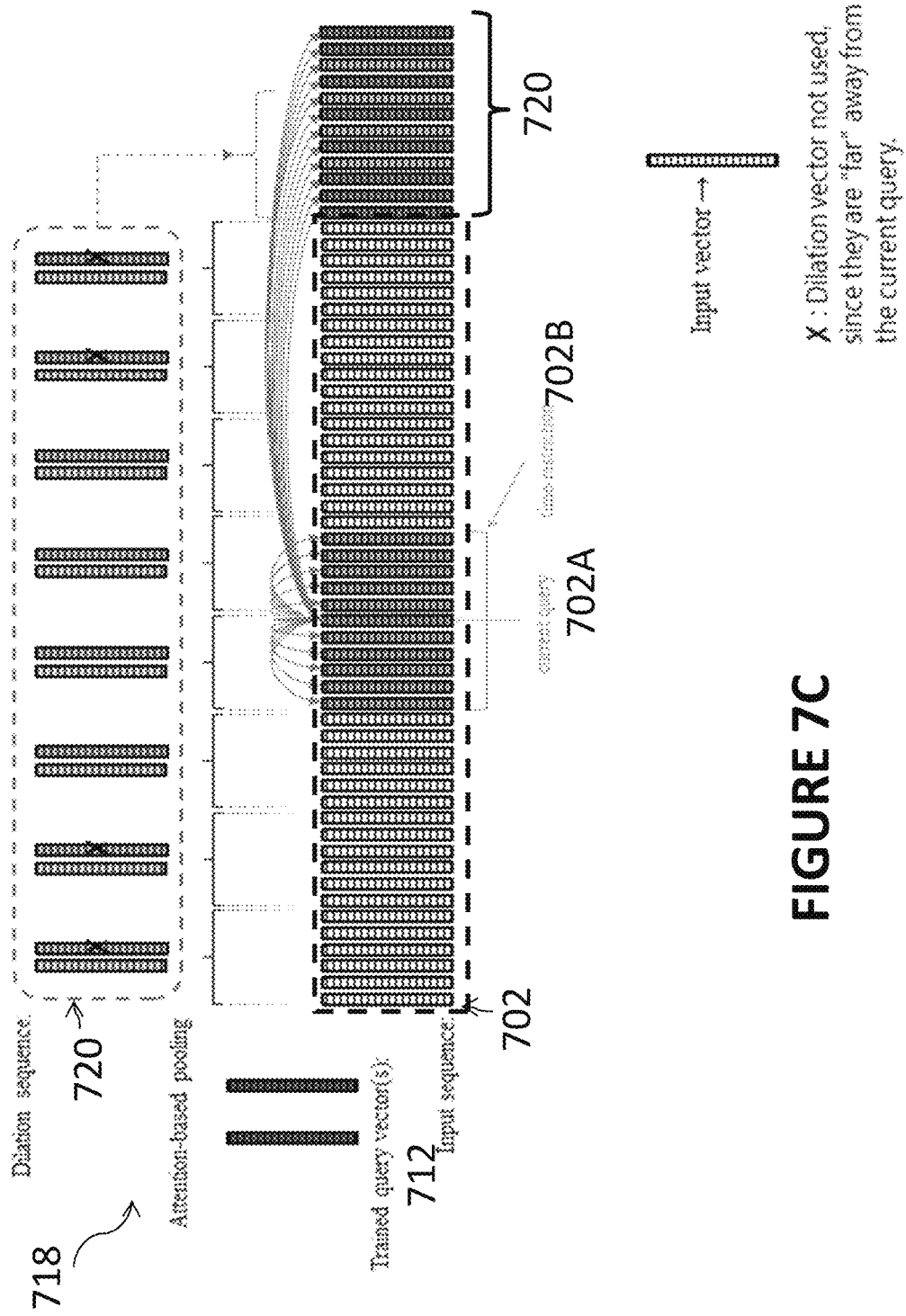
FIG. 7C illustrates multi-resolution dilated self-attention via attention-based pooling, in accordance with some embodiments of the present disclosure.

FIG. 7C illustrates multi-resolution dilated self-attention 718 via attention-based pooling, in accordance with some embodiments of the present disclosure. FIG. 7C is described with reference to FIGS. 7A and 7B.

Based on the execution of the attention-based pooling (as described above with reference to FIGS. 7A and 7B), multiple frames 720 are output (also called as output frames or dilation vectors). The output frames 720 are multi-resolution frames, where the resolution corresponding to each frame changes based on the location of the frame with respect to the current query frame 702A within a time restricted window 702B. The at least one processor is configured to analyze the output frames in order to produce the dilation sequence 720. To that end, the at least processor is configured to determine distance between each output frame and a current query frame 702A. In case the distance is more than a threshold value, the corresponding output frame is interpreted to be far away from the current query frame 702A. In such a case, the at least one processor is configured to discard the output frame. Accordingly, the output frames 720 which are situated at a distance more than the threshold distance are discarded. On the other hand, the output frames 720 which are situated at a distance less than the threshold distance are preserved. Accordingly, the dilation sequence 720 is produced. Hence, the information from the distant frames corresponding to the query frames and neighboring frames within the time restricted window 702B is utilized to determine the context of the current query frame 702A with less complexity. Further, the processor is configured to generate an output sequence based on the combination of the dilation sequence 720 and the current query frame 702A with corresponding neighboring frames within the time restricted window 702B.

The implementation of the AI system 102 in the ASR and AMT applications are described next with reference to FIGS. 8A and 8B.

Figure 8A:
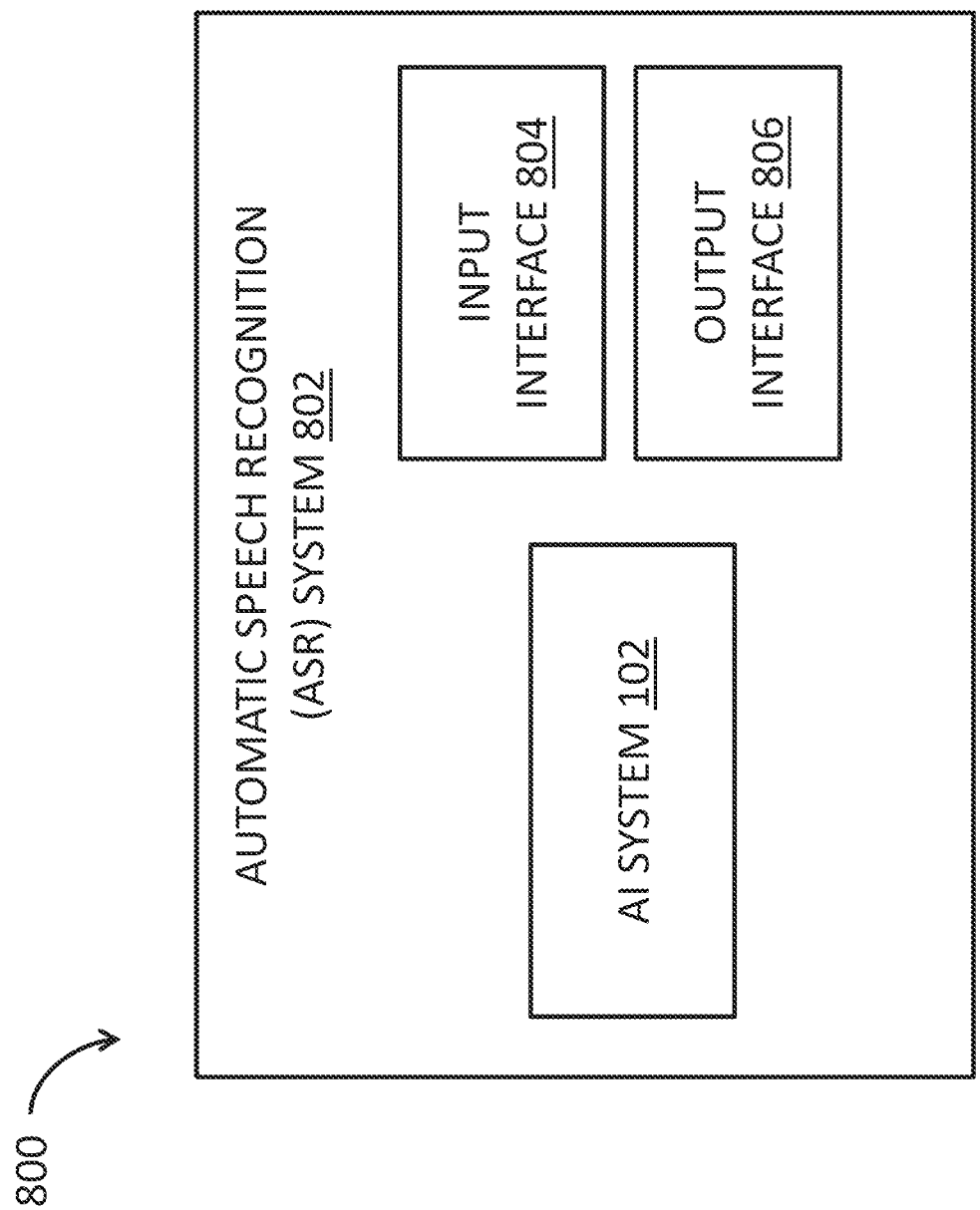
FIG. 8A is a block diagram of the AI system in automatic speech recognition (ASR) system, according to some embodiments of the present disclosure.

FIG. 8A is a block diagram 800 of the AI system 102 in an automatic speech recognition (ASR) system 802, according to some embodiments of the present disclosure. The ASR system 802 also comprises an input interface 804 and an output interface 806. The input interface 804 is configured to receive an acoustic signal representing at least a portion of a speech utterance. The neural network 806 of the AI system 102 converts the acoustic signal into the sequence of inputs. The neural network 206 further transforms the sequence of inputs into the sequence of outputs using the dilated self-attention module 208. In some embodiments, the sequence of inputs is transformed into the sequence of outputs using a plurality of dilated self-attention modules, where each self-attention module uses the dilation mechanism that may summarize the distant information that includes the relevant information. The transformed sequence of inputs is converted into a transcription of the speech utterance. The transcription of the speech utterance is provided as output via the output interface 806.

Figure 8B:
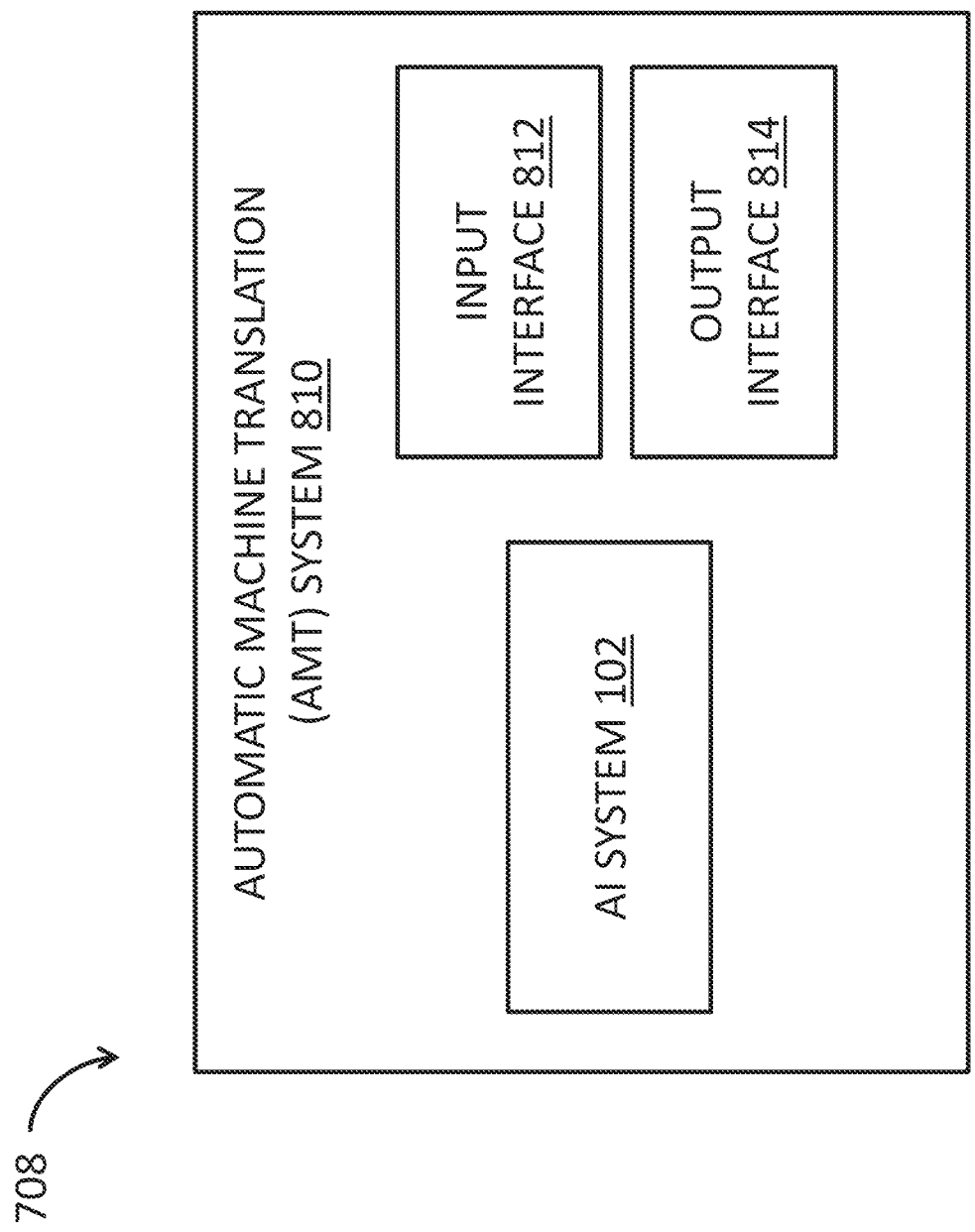
FIG. 8B is a block diagram of the AI system in an automatic machine translation (AMT) system, according to some embodiments of the present disclosure.

FIG. 8B is a block diagram 808 of the AI system 802 in an automatic machine translation (AMT) system 810, according to some embodiments of the present disclosure. The AMT system 810 also comprises an input interface 812 and an output interface 814. The input interface 812 is configured to receive an input signal representing a speech utterance in a first language. For example, the speech utterance may be in English language. The neural network 206 of the AI system 102 converts the input signal into the sequence of inputs. The neural network 206 transforms the sequence of inputs into the sequence of outputs using the dilated self-attention module 208. The transformed sequence of inputs is converted into an output signal that represents the speech utterance in a second language. For example, the second language may correspond to German language. The output signal representing the speech utterance in the second language is provided as output via the output interface 806.

Further, an AI system (such as the AI system 102) including a dilated self-attention module (such as the dilated self-attention module 208) can also be used in a streaming application. In such scenarios, input frames are received successively. The dilated self-attention module is utilized to produce a self-attention output with a limited delay for each of the input frames. To that end, the dilation sequence of the keys and the dilation sequence of the values are expanded whenever at least one new chunk of key frames and one new chunk of value frames has been received.

Similarly, the disclosed AI system including the dilated self-attention module can be implemented in different applications such as sound event detection, audio tagging system, an acoustic source separation system, and the like.

Figure 9:
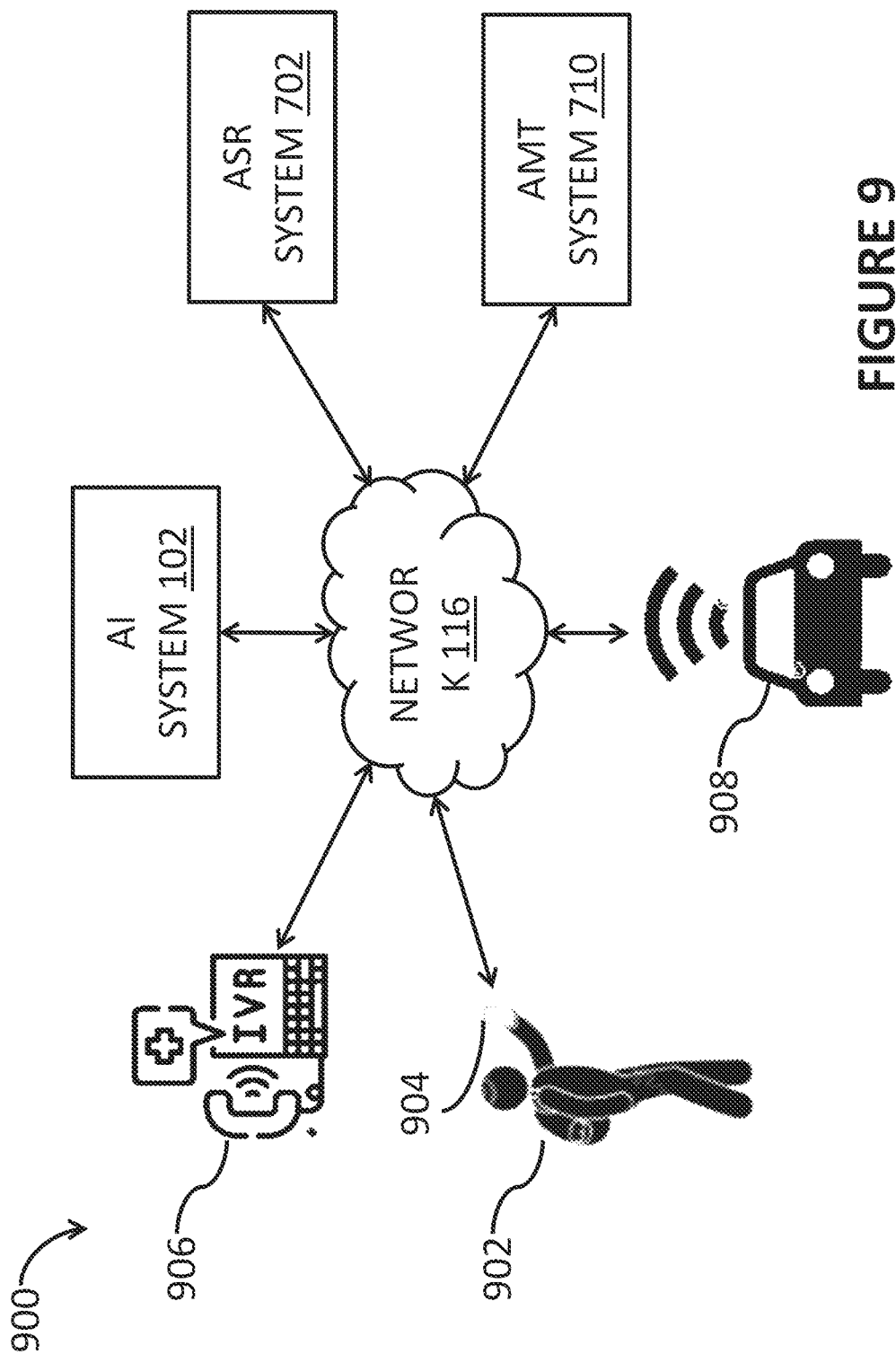
FIG. 9 illustrates an exemplary scenario for implementation of the AI system, according to some other example embodiments of the present disclosure.

FIG. 9 illustrates an exemplary scenario 900 for implementation of the AI system 102, according to some other example embodiments of the present disclosure. In an illustrative scenario, a user 902 may provide an input using a user device 904. The user device 904 may include a smartphone, a tablet, a laptop, a smartwatch, a wearable device, a desktop or any other electronic device. The user 902 may request for a service from a digital assistant 906. The digital assistant 906 may include a virtual chatbot, an interactive voice response (IVR) system or the like. The user 902 may provide an acoustic signal representing at least a portion of a speech utterance to the ASR system 702 from the user device 904, via the network 116. The ASR system 702 may provide a transcription of the speech utterance using the AI system 102. Further, the transcription may be provided to the digital assistant 906. The digital assistant 906 may operate and provide the service to the user 902 based on the received transcription. For instance, the service may correspond to hiring a vehicle 908. The vehicle 908 may include an autonomous vehicle, a manually driven vehicle or a semi-autonomous vehicle. The vehicle 908 may be connected to the network 116. The transcription may include pick-up and drop location for the user 902. Further, the user 902 may operate the vehicle 908 using the ASR system 702. In some cases, the ASR system 702, the AMT 710 or combination thereof implemented with the AI system 102 may be used for operations related to navigation system of the vehicle 908.

In some cases, the AI system 102 may also provide a speech-to-text documentation to the user 902. For instance, the user 902 may provide speech utterances to the user device 904. The user device 904 may communicate with the AI system 102 to provide a transcription of the speech utterances. The AI system 102 may provide a text document based on the transcription. This may help users, e.g., the user 902 to write texts or maintain documents via speech input.

In some other cases, the user 902 may be travelling in a foreign region. The user 902 may not able to communicate to people of the foreign region in corresponding foreign language. The user 902 may hire the vehicle 908 and a driver of the vehicle 908 may not speak the native language of the user 902 or may not know a common language to communicate with the user 902. In such cases, the user 902 may provide the input to the user device 904 for machine translation of native language of the user 902 to the foreign language. The input may correspond to an input signal representing a speech utterance in the native language, e.g., English language. The speech utterance in the native language may be provided to the AMT 710 from the user device 904, via the network 116. The AMT system 710 may translate the native language and provide a speech utterance of the foreign language using the AI system 102, in a fast and efficient manner.

Figure 10:
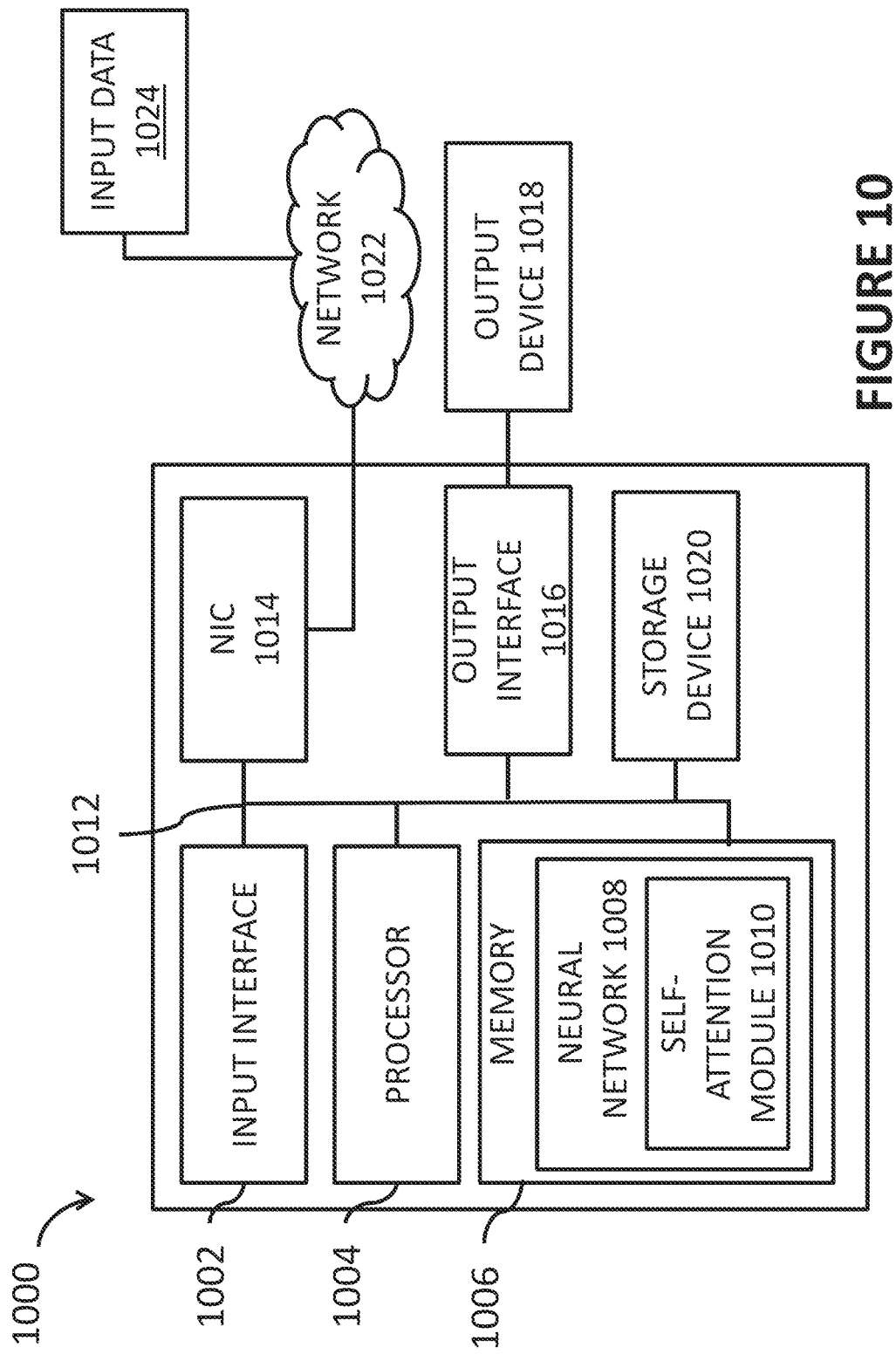
FIG. 10 shows an overall block diagram of the AI system, according to some example embodiments of the present disclosure.

FIG. 10 shows a block diagram of an AI system 1000, according to some embodiments of the present disclosure. The AI system 1000 corresponds to the AI system 102 of FIG. 1. The AI system 1000 comprises an input interface 1002, a processor 1004, a memory 1006, a network interface controller (NIC) 1014, an output interface 1016 and a storage device 1020. The memory 1006 is configured to store a neural network 1008. The neural network 1008 includes a dilated self-attention module 1010. In some example embodiments, the neural network 1008 has a transformer, conformer, or the like architecture including the dilated self-attention module 1010 as part of an encoder, a decoder, or both.

The dilated self-attention module 1010 is trained to transform a sequence of inputs into a corresponding sequence of outputs. The sequence of inputs is transformed by comparing each input with a different representation of the sequence of inputs. When the processor 1004 executes instructions stored in the memory 1006, the dilated self-attention module 1010 is caused to transform form an input from the sequence of inputs to form a representation of the sequence of inputs. The representation is formed by combining a first portion of the representation dependent on a location of the input in the sequence of inputs with a second portion of the representation independent from the location of the input. The first portion varies for transforming different inputs, while the second portion is a compression of the sequence of inputs that remains constant for transforming all inputs from the sequence of inputs. Further, the input is transformed into a corresponding output by comparing the input with the formed representation.

In some embodiments, the dilated self-attention module 1010 is configured to execute a selection function that select a subset of inputs from the sequence of inputs based on the location of the input to form the first portion of the representation of the sequence of inputs. The selection function accepts the location of the input as a parameter and returns the subset of inputs in the sequence of inputs centered on the location of the input. The selection function may also accept a value of a size of the subset of inputs as another parameter.

In some other embodiments, the dilated self-attention module 1010 is configured to form the compression by summarizing the sequence of inputs using a mean-pooling based approach. In a preferred embodiment, the summarization of the sequence of inputs may use attention-based pooling with or without a post-processing stage.

The input interface 1002 is configured to accept input data 1024. In some embodiments, the AI system 1000 receives the input data 1024 via network 1022 using the NIC 1014. In some cases, the input data 1024 may be online data received via the network 1022. In some other cases, the input data 1024 may be a recorded data stored in the storage device 1020. In some embodiments, the storage device 1020 is configured to store training dataset for training the neural network 1008.

In some example embodiments, the input data 1024 may include an acoustic signal representing at least a portion of a speech utterance, input signal representing a speech utterance in a first language, and/or the like. The neural network 1008 may be configured to convert the acoustic signal into the sequence of inputs, transform the sequence of inputs into the sequence of outputs using the dilated self-attention module 1010, and convert the sequence of outputs into transcription of the speech utterance. The output of the transcription may be provided to an output device 1018, via the output interface 1016. In a similar manner, the neural network 1008 may be configured to convert the input signal into the sequence of inputs, transform the sequence of inputs into the sequence of outputs using the dilated self-attention module, and convert the sequence of outputs into an output signal representing the speech utterance in the second language. The output signal may be provided to the output device 1018, via the output interface 1016.

Various embodiments of the present disclosure provide an AI system, e.g. the AI system 1000 that provides a dilated self-attention. The dilated self-attention improves accuracy and modeling capabilities of the restricted self-attention. The dilated self-attention also helps in reducing the computational complexity of self-attention for long input sequences. In this manner, computational cost and memory usage of a speech processing system (e.g., the ASR system 702 and the AMT system 710) may not grow quadratically, thereby improving efficiency of the system in a feasible manner.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. An artificial intelligence (AI) system for explaining inputs in a sequence of inputs jointly by exploring mutual dependence of the inputs on each other, the AI system comprising:
at least one processor; and memory having instructions stored thereon that, when executed by the at least one processor, cause the AI system to:
accept a sequence of input frames;
process the sequence of input frames with a neural network including at least one dilated self-attention module trained to compute from the sequence of input frames a corresponding sequence of outputs by transforming each input frame of the sequence of input frames into a corresponding query frame, a corresponding key frame, and a corresponding value frame leading to a sequence of key frames, a sequence of value frames, and a sequence of query frames of same ordering and by performing attention calculations for each query frame in the sequence of query frames with respect to local information including a portion of the sequences of key and value frames restricted based on a location of the query frame in the sequence of query frames combined with a compression of global information including a dilation sequence of the key frames and a dilation sequence of value frames extracted by processing different frames of the sequences of key and value frames with a predetermined extraction function, wherein the local information is different from the global information; and
render the sequence of outputs.

2. The AI system of claim 1, wherein, to produce the dilation sequence of key frames and the dilation sequence of value frames by a dilation mechanism, the at least one processor is configured to
partition the sequence of key frames and the sequence of value frames into a sequence of key chunks and a sequence of value chunks, wherein each key chunk includes multiple key frames and wherein each value chunk includes multiple value frames; and
apply the predetermined extraction function to each of the key chunks and to each of the value chunks to:
compress the multiple key frames of a key chunk into a smaller predetermined number of key frames of same dimensionality for the dilation sequence of key frames; and
compress the multiple value frames of a value chunk into the smaller predetermined number of value frames of same dimensionality for the dilation sequence of value frames.

3. The AI system of claim 2, wherein the processor is configured to compress at least some of the key chunks and some of the value chunks concurrently using parallel computation processes.

4. The AI system of claim 2,
wherein the predetermined extraction function is one or a combination of a sampling function, an average-pooling function, a max-pooling function, an attention-based pooling, and a convolutional neural network (CNN)-based pooling, wherein the sampling function selects a single frame from the multiple key frames of the key chunk and a corresponding frame from the multiple value frames of the value chunk,
wherein the average-pooling function averages the elements of the multiple key frames in the key chunk and the elements of the multiple value frames in the value chunk,
wherein the max-pooling function selects a single key frame of maximum energy from the multiple key frames in the key chunk and selects the corresponding frame from the multiple value frames in the value chunk,
wherein the attention-based pooling combines the multiple key frames in the key chunk and the multiple value frames in the value chunk according to weights determined by applying a trained query vector to the multiple key frames of the key chunk, and
wherein the CNN-based pooling applies convolution with trained weights and a kernel size similar to the chunk size to the sequence of key frames and to the sequence of value frames.

5. The AI system of claim 4,
wherein the subsampling and the max-pooling select a single key frame from a chunk of key frames and a corresponding value frame from a chunk of value frames and ignores information contained by other frames,
wherein average-pooling equally weights all the key frames in a chunk of key frames and all the value frames in a chunk of key frames, and
wherein the attention-based pooling assigns a relevance to either the key frames in a chunk of key frames or to the value frames in the chunk of value frames to derive a weight distribution and to use the weight distribution to compute the weighted average of all the key frames for a chunk of key frames and to compute the weighted average of all the value frames for a chunk of value frames.

6. The AI system of claim 2, wherein the predetermined function is an attention-based pooling that attends to each of the key chunks with a trained query vector to determine a weight distribution of the multiple key frames in the key chunk and computes a frame of the dilation sequence for the sequence of key frames as a weighted average of the multiple key frames in the key chunk with weights selected according to the determined weight distribution.

7. The AI system of claim 2, wherein the predetermined function is an attention-based pooling that attends to each of the key chunks with a trained query vector to determine a weight distribution of the multiple key frames in the key chunk and computes a frame of the dilation sequence for the sequence of values frames as a weighted average of the multiple values frames in the value chunk using the same determined weight distribution.

8. The AI system of claim 2,
wherein the predetermined function is an attention-based pooling, and wherein the attention-based pooling uses multiple trained query vectors to produce multiple weight distributions by attending to either the chunk of key frames or to the chunk of value frames and uses the multiple weight distributions to compute multiple output frames corresponding to weighted averages of the chunk of key frames and of the chunk of value frames, and
wherein the processor is further configured to execute post-processing on the multiple output frames of the key chunk and of the value chunk according to a post-processing rule to produce one or multiple frames for the dilation sequence of key frames and for the dilation sequence of value frames.

9. The AI system of claim 8, wherein, in order to derive frames for the dilation sequence of key frames and for the dilation sequence of value frames, the post-processing rule includes one or a combination of:
preserving the multiple output frames determined for the key chunk and for the value chunk,
combining the multiple output frames determined for the key chunk and for the value chunk, and
removing at least one of the multiple output frames determined for the key chunk and for the value chunk.

10. The AI system of claim 9, wherein the processor is further configured to adjust the post-processing rules for at least two different types of key and value chunks including a first type of key and value chunks with a distance smaller than a threshold to the query frame under the attention calculations and a second type of key and value chunks with a distance equal to or greater than a threshold to the query frame under the attention calculations.

11. The AI system of claim 10, wherein the processor is further configured to:
preserve the multiple frames determined for a first type of key and value chunks; and
remove at least one of the multiple frames of the second type of key and value chunks.

12. The AI system of claim 10, wherein the processor is further configured to:
preserve the multiple frames for the first type of key and value chunks; and
combine the multiple frames of the second type of key and value chunks using one or a combination of average-pooling and merging the multiple output frames determined for the key chunk and for the value chunk by a neural network processing.

13. The AI system of claim 11, wherein the neural network processing includes the use of two linear transforms with trained parameters separated by a non-linear activation function and with a bottleneck structure such that a first linear transform projects an input to a smaller dimensionality and a second linear transform projects an output of the first linear transform to the dimensionality of query frames, key frames, and value frames.

14. The AI system of claim 1, wherein the dilated self-attention module is used in a streaming application, where the sequence of input frames are received successively and a self-attention output is produced with a limited delay for each of the input frames by expanding the dilation sequence of the keys and the dilation sequence of the values when at least one new chunk of key frames and one new chunk of value frames is generated.

15. The AI system of claim 1, wherein the dilated self-attention module transforms the sequence of input frames into the sequence of query frames, the sequence of key frames, and the sequence of value frames, such that the attention calculations compare a query frame with a portion of key frames from the sequence of key frames and with the dilation sequence transformed from the sequence of key frames to produce an output from the sequence of a portion of value frames from the sequence of value frames and the dilation sequence of the value frames.

16. The AI system of claim 14, wherein the portion of key frames from the sequence of key frames and the portion of value frames from the sequence of value frames is selected based on the position of the query frame in the sequence of query frames.

17. The AI system of claim 1, wherein the neural network includes multiple layers of dilated self-attention modules.

18. The AI system of claim 2,
wherein the processor is further configured to produce, sequentially on a process pipeline, a first dilation sequence for the key frames and for the value frames by a first dilation mechanism and a second dilation sequence for the key frames and for the values frames by a second dilation mechanism, and
wherein the first dilation sequence with a first chunk size corresponds to an input to a second dilation mechanism with a second chunk size to render the second dilation sequence of the key frames from the first dilation sequence of the key frames and the second dilation sequence of the value frames from the first dilation sequence of the value frames.

19. The AI system of claim 17, wherein the processor is further configured to:
preserve the frames of a first dilation sequence for the key frames and for the value frames that correspond to key chunks and value chunks with a frame distance less than a predefined threshold relative to the query frame under the attention calculations; and
preserve the frames of a second dilation sequence for the key frames and for the value frames that correspond to key chunks and values chunks with a frame distance equal to or greater than the predefined threshold relative to the query frame under the attention calculations.

20. The AI system of claim 1, wherein the neural network has a transformer or conformer architecture including the dilated self-attention module as part of an encoder, a decoder, or both.

21. The AI system of claim 1 forming at least a part of one or a combination of an automatic speech recognition (ASR) system, a sound event detection system, an audio tagging system, an acoustic source separation system, and a machine translation system.

* * * * *